(12) United States Patent
Tsukatani

(10) Patent No.: US 8,997,786 B2
(45) Date of Patent: Apr. 7, 2015

(54) WORK VEHICLE HAVING HYDRAULIC APPARATUS

(71) Applicant: Kubota Corporation, Naniwa-ku, Osaka-shi, Osaka (JP)

(72) Inventor: Hisashi Tsukatani, Sakai (JP)

(73) Assignee: Kubota Corporation, Osaka (JP)

( * ) Notice: Subject to any disclaimer, the term of this patent is extended or adjusted under 35 U.S.C. 154(b) by 196 days.

(21) Appl. No.: 13/851,550

(22) Filed: Mar. 27, 2013

(65) Prior Publication Data
US 2013/0228246 A1    Sep. 5, 2013

Related U.S. Application Data

(62) Division of application No. 12/725,049, filed on Mar. 16, 2010.

(30) Foreign Application Priority Data

Oct. 5, 2009 (JP) ................................. 2009-231791
Oct. 5, 2009 (JP) ................................. 2009-231838

(51) Int. Cl.
| F16K 11/18 | (2006.01) |
| F16K 11/20 | (2006.01) |
| E02F 9/20  | (2006.01) |
| E02F 9/22  | (2006.01) |
| G05G 9/047 | (2006.01) |

(52) U.S. Cl.
CPC .............. *F16K 11/20* (2013.01); *E02F 9/2004* (2013.01); *E02F 9/226* (2013.01); *E02F 9/2267* (2013.01); *G05G 2009/04714* (2013.01)

(58) Field of Classification Search
USPC ................ 137/637; 251/89, 90, 91, 101, 251; 74/527, 529; 37/234
See application file for complete search history.

(56) References Cited

U.S. PATENT DOCUMENTS

| 4,427,176 A * | 1/1984 | Livet ................................ 74/529 |
| 4,526,204 A   | 7/1985 | Primdahl |
| 4,723,933 A * | 2/1988 | Marto ............................. 74/527 |
| 5,398,181 A * | 3/1995 | Yeh ................................. 363/95 |
| 5,727,426 A * | 3/1998 | Lykken et al. .................. 74/526 |
| 5,743,297 A * | 4/1998 | Mueller ...................... 137/636.2 |
| 6,557,586 B1  | 5/2003 | Lockyer et al. |
| 7,617,620 B2  | 11/2009 | Fukudome et al. |
| 2008/0238153 A1 | 10/2008 | Nishino |

FOREIGN PATENT DOCUMENTS

| JP | 63179520 U | 11/1988 |
| JP | 481343 A  | 3/1992 |
| JP | 2003288127 A | 10/2003 |
| JP | 2008245609 A | 10/2008 |

* cited by examiner

*Primary Examiner* — Kevin Lee
(74) *Attorney, Agent, or Firm* — The Webb Law Firm

(57) ABSTRACT

Disclosed is a work vehicle having a hydraulic apparatus which can reliably prevent erroneous operation of the valve of the hydraulic apparatus even when the operating lever is moved inadvertently. With this hydraulic apparatus, with operations of a single operating lever in two directions, two valves are operated respectively. Two valve operating links for operating the two valves respectively are pivotally supported to a support shaft provided to a pair of frame plates and a lock pin is provided to the frame plates. The two valve operating links form pin holes. When the two valves are at the neutral positions, the lock pin is inserted into the pin holes with a locking operation of a lock operating tool, thus fixing the valve operating links and locking the valves.

3 Claims, 19 Drawing Sheets

Fig.21
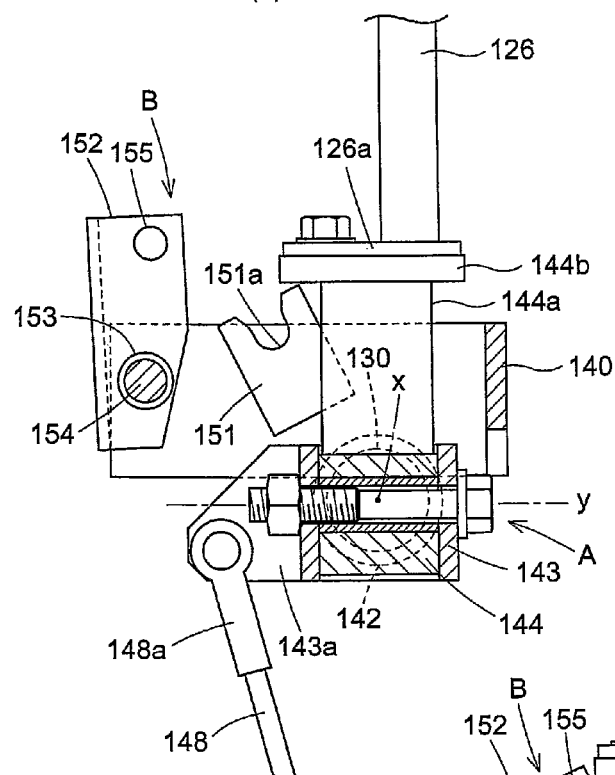
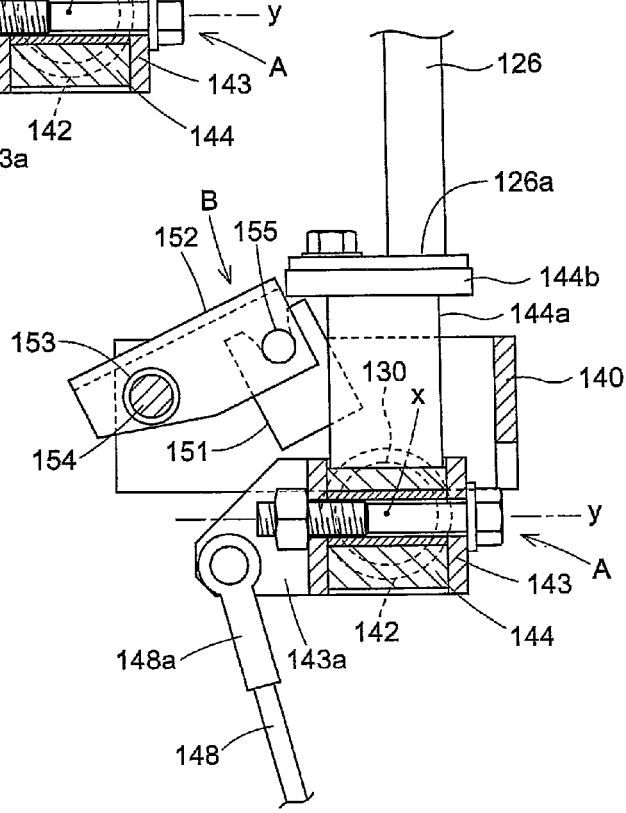

WORK VEHICLE HAVING HYDRAULIC APPARATUS

CROSS REFERENCE RELATED TO APPLICATIONS

This application is a divisional application of U.S. patent application Ser. No. 12/725,049 entitled "Work Vehicle Having Hydraulic Apparatus" filed on Mar. 16, 2010,now U.S. Pat. No. 8,469,058 which claims priority to Japanese Patent Application Nos. 2009-231791 and 2009-231838, both filed on Oct. 5, 2009, the entire disclosures of which are herein incorporated by reference.

BACKGROUND OF THE INVENTION

1. Field of the Invention

The present invention relates to a work vehicle having a hydraulic apparatus. More particularly, the invention relates to a hydraulic apparatus wherein two valves for two hydraulic units are operably coupled to a single operating lever, which lever is operable in a first direction and a second direction intersecting the first direction, and the valves are operated individually by operating the operating lever in the first and second directions, respectively.

2. Description of the Related Art

JP 2008-245609 A discloses a technique according to which a single lever is operated in two directions for individually operating two valves in the first direction and in the second direction, respectively. More particularly, according to the technique disclosed in this JP 2008-245609 A, a coupling mechanism provided between the two valves and the operating lever incorporates two valve operating links connected respectively to the valves. These two valve operating links are mounted to a frame plate having an angular hook-like cross sectional shape, with the operating links being mounted in opposition to each other along the front/back direction. The frame plate supports cantilever-wise two boss portions, one boss portion supporting a support shaft oriented along the right/left lateral direction for operating the operating lever in the front/back direction, the other boss portion slidably receiving therein a lock pin in the right/left lateral direction. In operation, when the operating lever is located at its neutral position, the lock pin will be operated to be inserted into the boss portion formed integrally with the operating lever, thereby locking this operating lever. With this, the two valves can be fixed at the neutral positions.

According to the above-described technique disclosed in JP 2008-245609A, with insertion of the single lock pin into the boss portion formed integrally with the operating lever, the operating lever is locked relative to the direction intersecting the lock pin and the inserting direction to the boss portion. Therefore, if there exist a large gap between the boss portion slidably supporting the lock pin and the lock pin and a large gap between the boss portion formed integrally with the operating lever and the lock pin, if this operating lever is operated inadvertently under the locked condition of the operating lever, the locking boss portion tends to slide in the axial direction of the lock pin, whereby the one valve operating link may be operated erroneously to move the valve.

The object of the present invention is to provide a work vehicle having a hydraulic apparatus which can reliably prevent such erroneous operation of the valve of the hydraulic apparatus even when the operating lever is moved inadvertently.

SUMMARY OF THE INVENTION

The above-noted object is fulfilled according to an aspect of the present invention as under:—

A work vehicle having a hydraulic apparatus, comprising:
  a single operating lever;
  a first valve operable by an operation of the operating lever in a first direction;
  a second valve operable by an operation of the operating lever in a second direction intersecting the first direction;
  a first valve operating link pivotally supported to a support shaft of the operating lever, the first valve operating link supplying/draining pressure oil to/from a first hydraulic unit via the first valve;
  a second valve operating link pivotally supported to the support shaft of the operating lever, the second valve operating link supplying/draining pressure oil to/from a second hydraulic unit via the second valve;
  a pair of frame plates disposed in opposition to each other across the first and second valve operating links therebetween; and
  a boss portion supported by the pair of frame plates and supporting the support shaft of the operating lever;
wherein:
  the pair of frame plates include a lock pin;
  the first valve operating link defines a first pin hole;
  the second valve operating link defines a second pin hole; and
  when the first valve and the second valve are located at neutral positions thereof, the first and second valve operating links are fixed to lock the first and second valves by inserting the lock pin into the respective pin holes.

With this construction, the pair of frame plates disposed in opposition across the valve operating links therebetween hold the boss portion for supporting the support shaft of the operating lever from the opposed sides thereof, so that the frame plates per se are formed sturdy and the boss portion too is firmly supported to the frame plates. Even when the operating lever is operated in two directions, there occurs no looseness or displacement of the boss portion, so that its support shaft can be supported in a reliable manner. Hence, there occurs no displacement in the operations of the operating lever in the first direction and the second direction, and the operating lever can be operated lightly and smoothly.

When the two valves are at the neutral positions, by inserting the single lock pin into the plurality of pin holes defined in the two valve operating links, these two valves are locked at the same time. That is, the two valve operating links are directly locked with insertion of the single pin into the holes defined in the two valve operating links provided respectively for operating the two valves. Therefore, even if there exists some play on the side of the operating lever, the two valves can be locked at the neutral positions in a reliable manner.

Further, as the valve operating links, the boss portion supporting the support shaft of the operating lever, the lock pin, etc. are supported to the pair of frame plates, these components can be manufactured as one integral unit (assembly) and assembled as such to the work vehicle.

Therefore, since both the valve operable by the operation of the operating lever in the first direction and the further valve operable by the operation of the operating lever in the second direction can be locked at the respective neutral positions thereof reliably, even if the operating lever is moved inadvertently, erroneous movements of the valves can be prevented in a reliable manner.

Since the pair of frameworks (the valve operating links, the boss portion, the lock pin, etc.) can be formed as a single unit (assembly), the productivity can be improved.

In the above-described construction, preferably, the lock pin is supported to one of the pair of frame plates when the locking of the valves is released; whereas, the lock pin is supported to both of the pair of frame plates when the valve operating links are fixed for locking the first and second valves. With this construction, a further advantage as follows can be achieved.

Namely, when the valve operating links are fixed for locking the valves, the lock pin is supported from both sides thereof by pair of frame plates. So, the valves can be fixed and maintained in a more reliable manner than the case of the valves being locked by the lock pin under its one-side supported state, i.e. cantilevered state. As a result, the valves can be locked at the neutral positions with even greater reliability.

The present invention provides a further characterizing feature as under:—

A work vehicle having a hydraulic apparatus, comprising:
  a single operating lever;
  a first valve operable by an operation of the operating lever in a first direction;
  a second valve operable by an operation of the operating lever in a second direction intersecting the first direction;
  a locking mechanism for locking the operating lever at a neutral position thereof, the locking mechanism including:
    a concave member attached to one of a movable support portion and a base portion of the operating lever, the concave member defining a concave portion at an end thereof;
    a clamping member attached to the other of the movable support portion and the base portion of the operating lever for clamping the concave member, the clamping member including a pin engageable with the concave portion;
  wherein, when the operating lever is at the neutral position, the operating lever is locked to be immovable in the first or second direction by moving the support portion to cause the clamping member to clamp the concave member and also to cause the pin to engage the concave portion.

The above-described construction provides two functions to the concave member—the concave member per se provides a function as an engaged member to be clamped by the clamping member and the concave portion of this concave member provides a function as a further engaged member to be engaged by the pin included in the clamping member. Similarly, the clamping member also provides two functions of clamping the concave member and the engagement with the concave portion with the pin. Hence, with respective engagements of these, by the two functions on each side, the locking of the operating lever in the first direction and the locking of the operating lever in the second direction are effected.

That is to say, with the two kinds of engagement, i.e. the clamping of the concave member by the clamping member (first engagement) and the engagement between the concave portion of the concave member and the pin of the clamping member (second engagement), the operating lever is locked against its movement in two directions, i.e. the first direction and the second direction individually. With this, the locking operations of the operating lever both in the first and second directions can be provided in a reliable manner.

Since the locking operations of the operating lever in the first direction and the second direction can be provided in a reliable manner, the locking mechanism of the operating lever can be used for an extended period of time.

In the above-described construction, preferably, the support portion comprises a pivotable and fixable support shaft, and when the operating lever is located at the neutral position, the operating lever is locked to be immovable in the first or second direction by pivoting the support shaft. With this construction, a further advantage as follows can be achieved.

Namely, the locking operation and the lock-releasing operation of the operating lever can be effected by pivoting the concave member of the locking mechanism or the support shaft including the clamping member. Hence, the locking and lock-releasing operations of the operating lever can be effected easily and conveniently.

Still preferably, there is provided holding means for holding a locked condition provided by the engagement between the concave member and the clamping member and also holding a lock-released condition provided by detachment between the concave member and the clamping member. With this, inadvertent locking or lock-releasing of the operating lever when the operating lever is to operated can be prevented in a reliable manner Further and other characterizing features and advantages resulting therefrom of the present invention will become apparent upon reading the following detailed description of the preferred embodiments thereof with reference to the accompanying drawings.

In the following, the respective embodiments will be described by taking a tractor as an example of the work vehicle.

BRIEF DESCRIPTION OF THE DRAWINGS

FIGS. 1-9 show a work vehicle (tractor) according to a first embodiment of the present invention; in which, FIG. 1 is a partial side view of the tractor mounted with a front loader, FIG. 2 is a side view of an operating section of a switchover valve, FIG. 3 is a rear view of the operating section of the switchover valve, FIG. 4 is a plan view of the operating section of the switchover valve, FIG. 5 is a plan view in horizontal section of a support portion of an operating lever, FIG. 6 is a plan view in partial horizontal section showing an operating portion of the switchover valve, FIG. 7 is a side view in partial vertical section of a locking arrangement of a valve operating link, FIG. 8 is a perspective view showing an operating portion of the switchover valve, and FIG. 9 is an exploded perspective view of the valve operating link, FIGS. 10-16 show a work vehicle (tractor) according to a second embodiment of the present invention; in which, FIG. 10 is a side view of an operating section of a switchover valve, FIG. 11 is a rear view of the operating section of the switchover valve, FIG. 12 is a plan view of the operating section of the switchover valve, FIG. 13 is a plan view in partial horizontal section showing an operating portion of the switchover valve, FIG. 14 is a side view in partial vertical section of a locking arrangement of a valve operating link, FIG. 15 is a perspective view showing the operating portion of the switchover valve, and FIG. 16 is an exploded perspective view of the valve operating link, FIGS. 17-22 show a work vehicle (tractor) according to a third embodiment of the present invention; in which, FIG. 17 is a side view of the tractor mounted with a front loader, FIG. 18 is a perspective view showing an operating mechanism of an operating lever for operating two valves, FIG. 19 is a rear view showing the operating mechanism of the operating lever for operating the two valves, FIG. 20 shows a lever locking mechanism, (a) being a side view showing a lock-released condition, (b) being a side view showing a locked condition, FIG. 21 shows the lever locking mechanism, (a) being a side view in vertical section showing the lock-released condition, (b) being a side view in vertical section showing the locked condition, and FIG. 22 is a plan view showing the lever locking mechanism.

DETAILED DESCRIPTION OF THE PREFERRED EMBODIMENTS

[First Embodiment]

Figure 1:
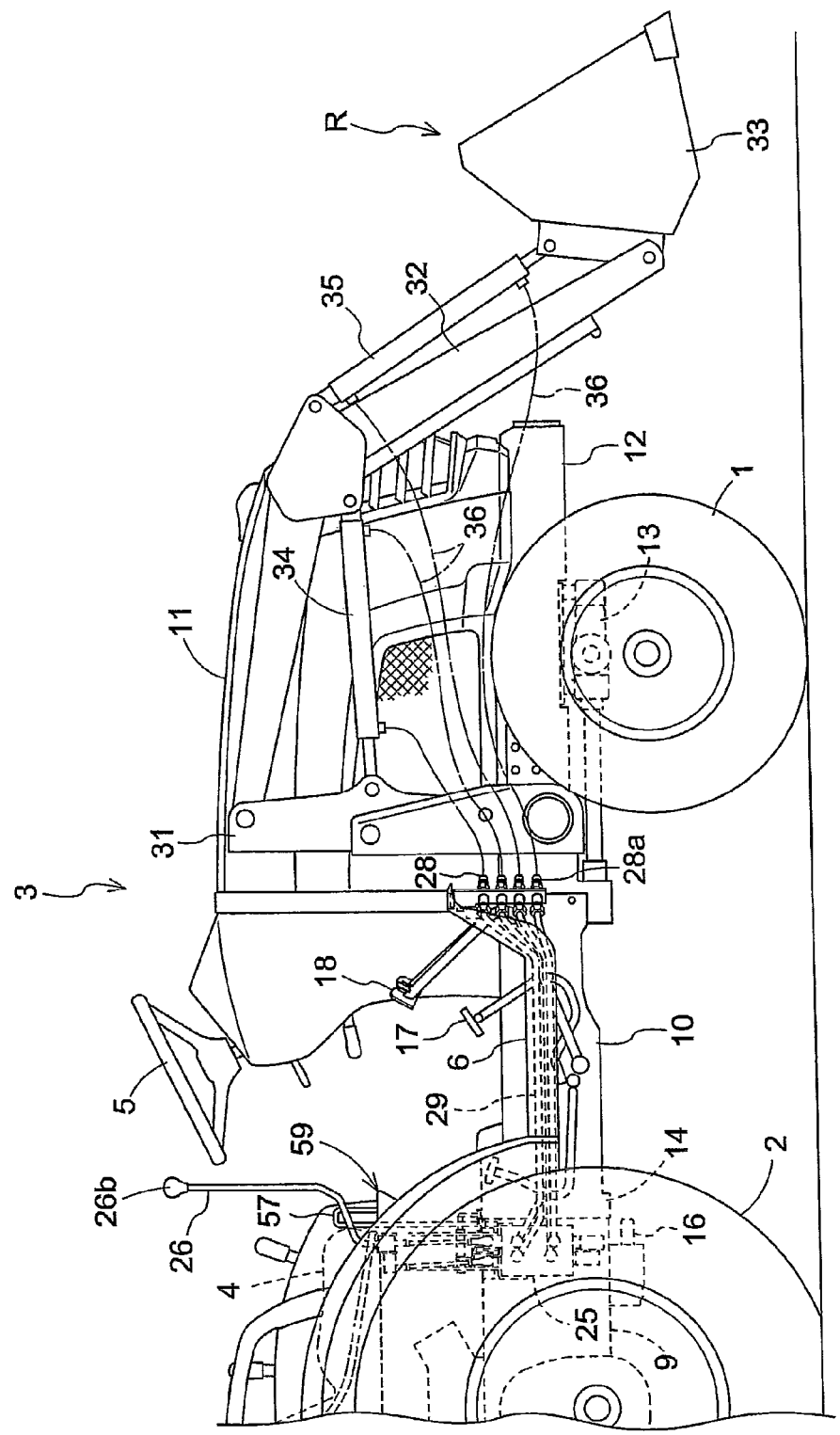

FIGS. 1-9 show a work vehicle (tractor) according to a first embodiment. In this embodiment, FIG. 1 is a partial side view of a tractor mounted with a front loader R. This tractor includes a traveling vehicle body 3 having front wheels 1 and rear wheels 2, the body 3 mounting a driver's seat 4, a front-wheel steering wheel 5, a driver's access step 6, etc.

The traveling vehicle body 3 is formed by connecting a vehicle body front section mounting an engine (not shown) and a transmission case 9 provided in a vehicle body rear section via an intermediate housing 10 having a hollow construction formed of metal plates. The engine is covered with a hood 11, and to a front frame 12 connected to the engine, there is supported a front axle case 13 mounting/supporting the right/left front wheels 1 to be steerable, with the front axle case 13 being capable of a rolling action. And, the rear wheels 2 are supported to right/left rear portions of the transmission case 9.

The power of the engine is shaft-transmitted to a hydrostatic stepless speed-changing unit (HST) 14 directly connected to the front end of the transmission case 9, so that the engine power is speed-changed in stepless manner in the forward and reverse directions. This forward or reverse, speed-changed power is further speed-changed by gears in a plurality of speed steps inside the transmission case 9 and front-wheel driving power taken off from the rear wheel transmission line is shaft-transmitted to the front section of the vehicle body to be transmitted to the front axle case 13.

A part of the engine power inputted to the stepless speed-changing unit 14 is transmitted as it is, i.e. without being speed-changed, to a PTO transmission line provided inside the transmission case 9, so that this power can be taken off from a rear PTO shaft (not shown) mounted at a rear portion of the transmission case 9 and a mid PTO shaft 16 mounted at a lower portion of the transmission case 9, as a "live PTO power" which is rotated at a fixed speed, regardless of the traveling speed.

On the right side of the driver's access step 6, there is provided a speed-changing pedal 17 urged to return to its neutral position and this pedal 17 is link-coupled to an unillustrated speed-changing operating shaft of the stepless speed-changing unit 14. Forwardly of the right side of the driver's access step 6, there are provided a pair of right/left side brake pedals 18.

To the front portion of the traveling vehicle body 3, the front loader R is detachably attached. A hydraulic apparatus for driving this front loader R is constructed as follows.

On the right side of the driver's seat 4, a switchover valve 25 is fixedly mounted, and an operating lever 26 for switching over this switchover valve 25 extends first forwardly and then upwardly. As shown in FIGS. 1-4, the switchover valve 25 includes two, three-position switchover type, spool valves 23, 24 mounted in juxtaposition in the front/back direction, to be operably coupled with an operating lever 26 as will be described later. With crisscross operations of the operating lever 26, feeding/draining of pressure oil to/from the two sets of hydraulic circuits is possible.

On the right side and forwardly of the driver's access step 6, four pipe connecting members 28 having automatic closing type pipe connecting ports 28a are mounted vertically in series, with each pipe connecting member 28 and the switchover valve 25 being connected and communicated to each other via four metal pipes 29.

Referring to the front loader R, to a support frame 31 connected and fixed to front right/left portions of the traveling vehicle body 3, a boom 32 is connected to be vertically pivotable. And, a bucket 33 is pivotally connected to the leading end of the boom 32 to be capable of pivotal dumping actions. And, a boom cylinder 34 and a bucket cylinder 35 which comprise double-action type cylinders are connected and communicated to the four pipe connecting members 28 via pressure-resistant hydraulic hoses 36, respectively.

FIGS. 2-9 show an operating construction of the switchover valve 25. Upwardly of a valve body 25a of the switchover valve 25, a pair of support brackets 40, 41 are mounted erect, as "a pair of frame plates" on the front and rear sides and spaced apart by a predetermined distance therebetween across valve operating links 38, 39. At the upper end of one (rear side) support bracket 40, there is formed a bent portion 40a extending toward the other (front side) support bracket 41. To and between an end of this bent portion 40a and the other support bracket 41, there is fixed a right/left oriented boss portion 42, with the boss portion 42 being supported in a longitudinal direction along an axis (x) of a right/left oriented support shaft 30.

A first operating tool 43 having an angular hook-shape cross section is mounted to be pivotable about the lateral axis (x) and to this first operating tool 43, a second operating tool 44 is pivotally attached to be pivotable about a front/back oriented axis (y). And, to the upper face of this second operating tool 44, a base end portion 26a of the operating lever 26 is fixed.

The pair of front and rear support brackets 40, 41 respectively define boss portions 46 for supporting a front/back oriented support shaft 45 and this front/back oriented support shaft 45 supports boss portions 38a, 39a provided at the base ends of the valve operating links 38, 39 to be vertically pivotable about an axis (a). Respective free ends of these valve operating links 38, 39 are connected respectively to the spool valves 23, 24 via pins 47.

Figure 3:
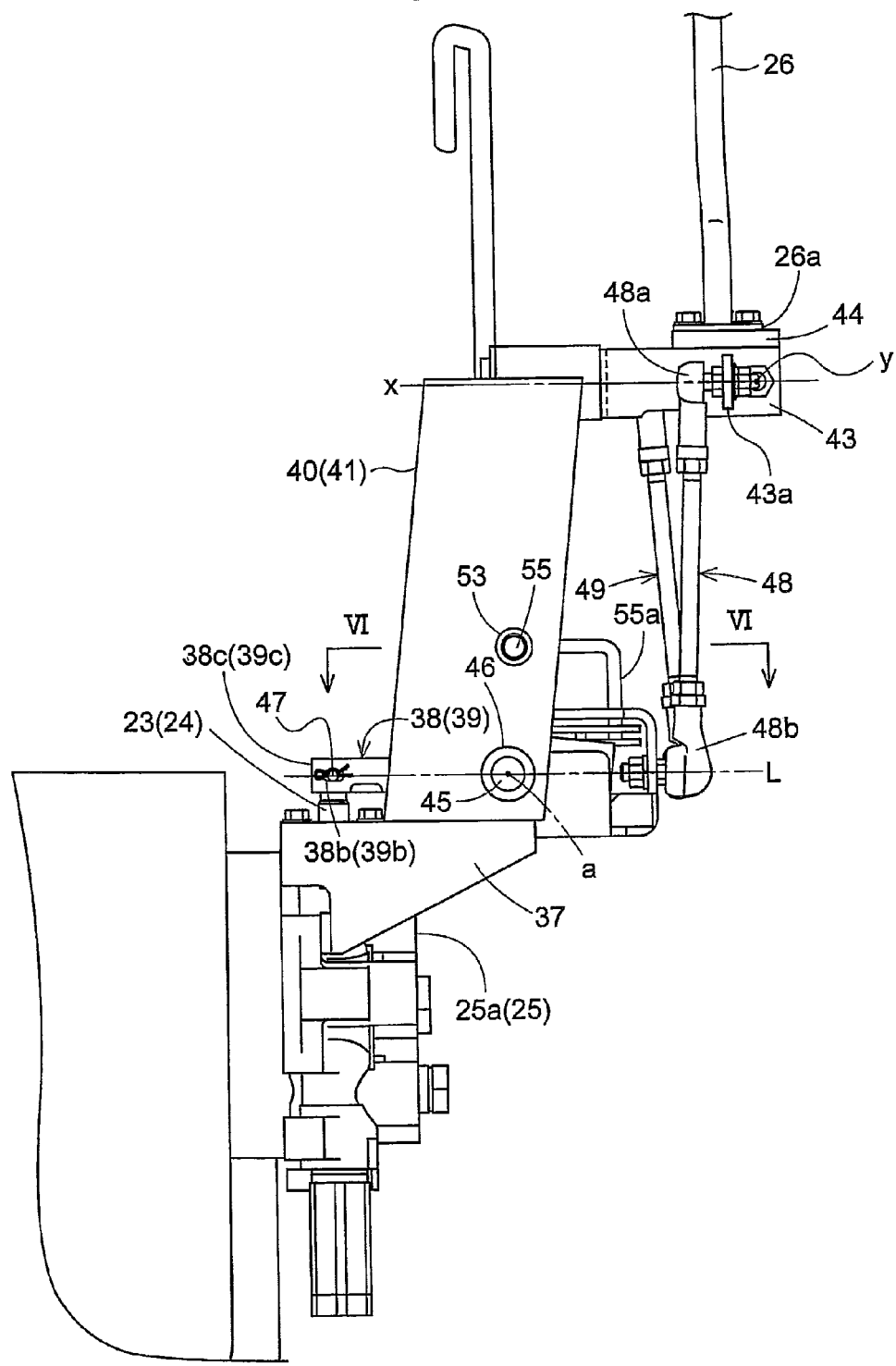

As shown in FIG. 3, the working points (the positions of the pins 47) on the side of the spool valves 23, 24, the axis (a) (pivot) of the front/back oriented support shaft 45 and coupling members 48b, 49b (power points) are aligned side by side along a straight line L in the rear view, and also, a lock pin 55 is disposed immediately upwardly of the axis (a) (pivot) of the front/back oriented support shaft 45.

The valve operating link 38, 39 each includes a boss portion 38a, 39a for allowing insertion of the front/back oriented support shaft 45, an arm portion 38c, 39c having a U-shape in the plan view defining a slot 38b, 39b for allowing insertion of a pin 47 for connection of the spool valve 23 at the other end relative to the boss portion 38a, 39a as the base end, a two-forked shaped arm portion 38e, 39e having a bent piece 38d, 39d formed on the opposite side away from the arm portion 38c, 39c relative to the boss portion 38a, 39a.

Figure 2:
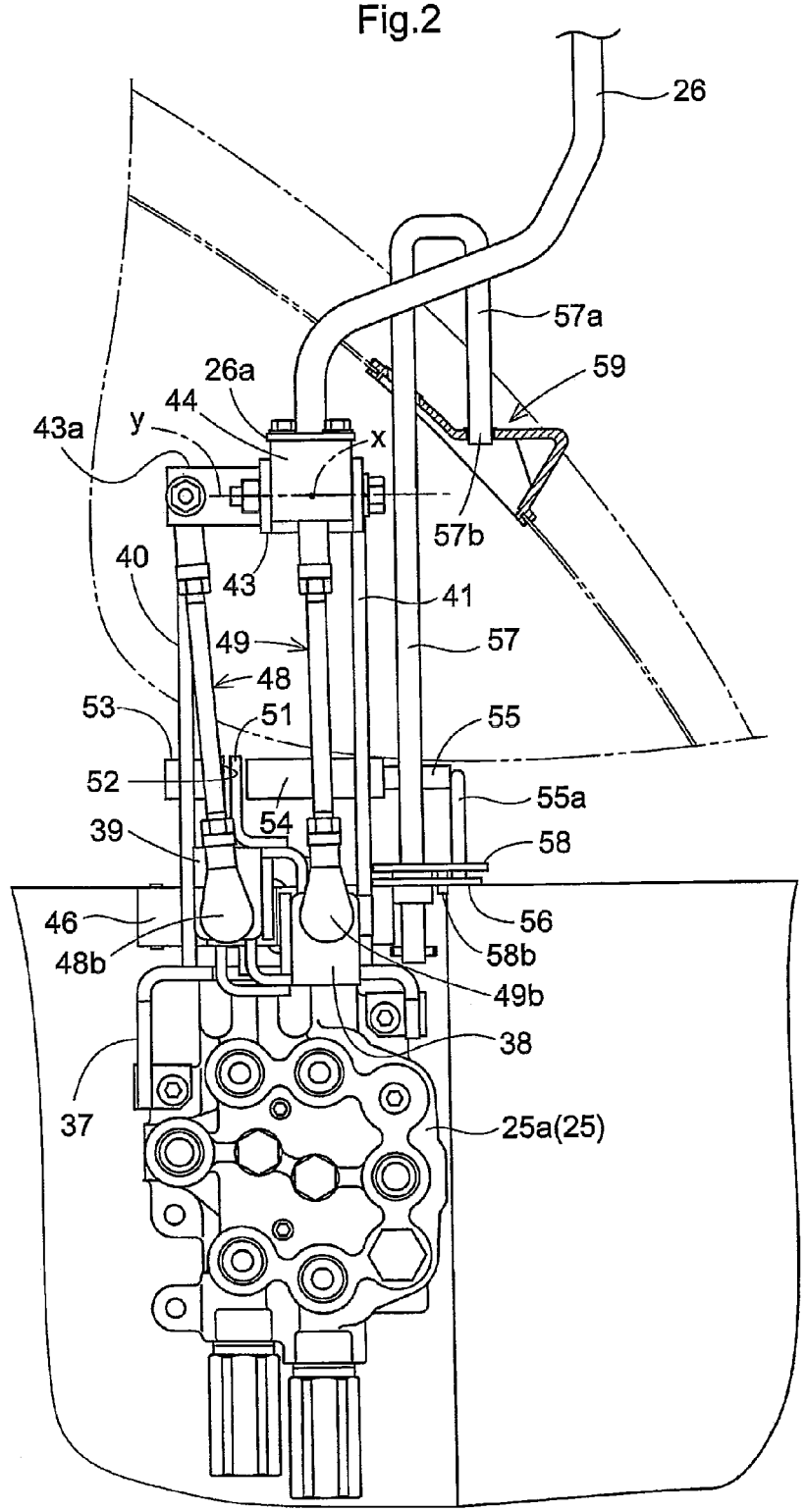
Figure 4:
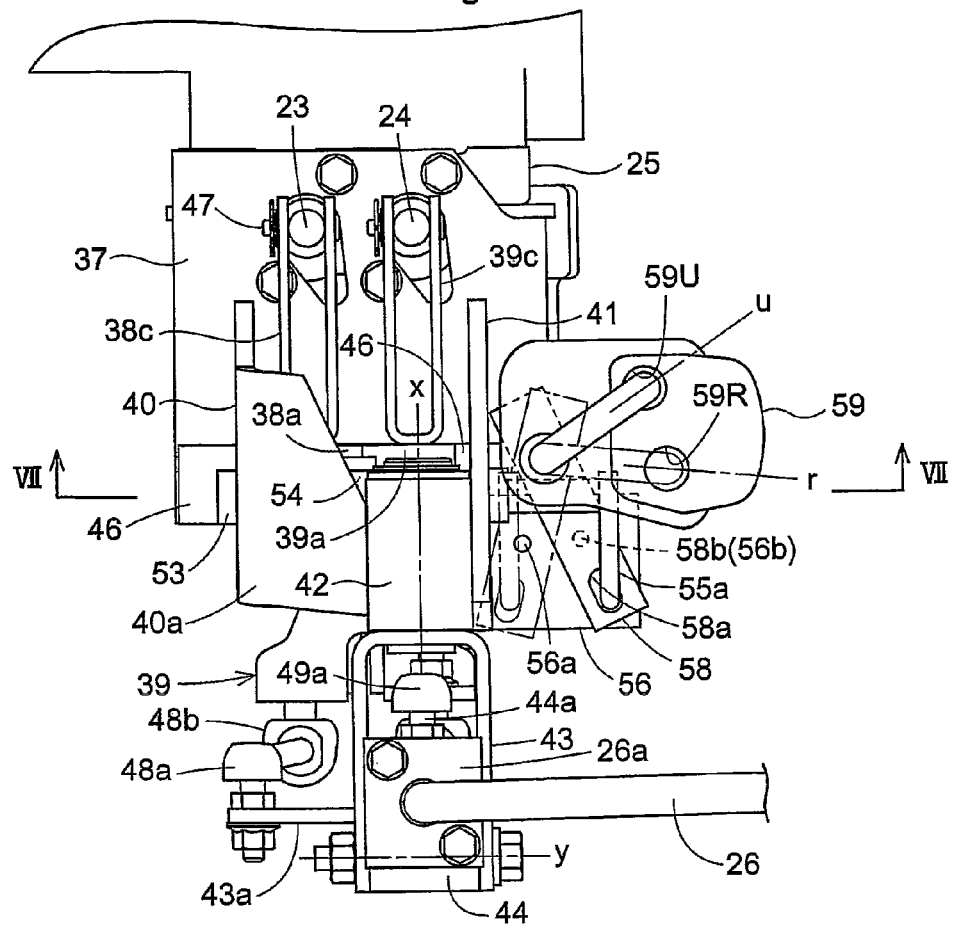
Figure 5:
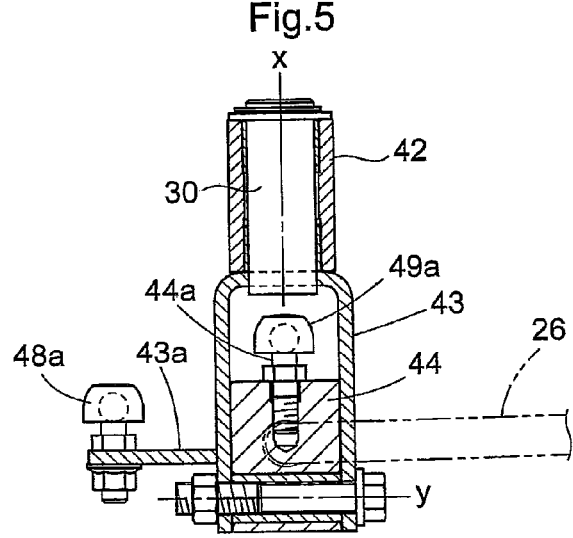

As shown in FIG. 2, FIG. 4 and FIG. 5, from the first operating tool 43, an operating arm 43a extends rearwards, and from the second operating tool 44, an operating pin 44a extends inward in the right/left direction. The operating arm 43a and the bent piece 39c of the one valve operating link 39 are operably coupled with each other via a rod 48 mounting coupling members 48a, 48b with spherical pivots at the opposed ends thereof; and operating pin 44a and the bent piece 38d of the other valve operating link 38 are operably coupled with each other via a rod 49 mounting coupling members 49a, 49b with spherical pivots at the opposed ends thereof.

Therefore, when a grip 26b of the operating lever 26 is located at a neutral position in the front/back and right/left directions, the two spool valves 23, 24 are located at the respective neutral positions thereof. When the grip 26b of the operating lever 26 is moved forwardly or rearwardly from the neutral position, the first operating tool 43 is pivoted about the laterally oriented axis (x), whereby one spool valve 24 is slid vertically. When the grip 26b of the operating lever 26 is moved to the left or right side from the neutral position, the second operating tool 44 is pivoted about the front/back oriented axis (y), whereby the other spool valve 23 is slid vertically.

When the front loader R is mounted, the boom cylinder 34 is pipe-connected to the hydraulic circuit that is switched over by one spool valve 24, whereas the bucket cylinder 35 is pipe-connected to the hydraulic circuit that is switched over by the other spool valve 23. In this case, when the grip 26b of the operating lever 26 is operated forward from the neutral position, the boom cylinder 34 is contracted to lower the boom 32, whereas, when the grip 26b of the operating lever 26 is operated rearward from the neutral position, the boom cylinder 34 is expanded to elevate the boom 32. When the grip 26b of the operating lever 26 is operated to the right side from the neutral position, the bucket cylinder 35 is expanded to dump the bucket 33 downwards; whereas, when the grip 26b of the operating lever 26 is operated to the left side from the neutral position, the bucket cylinder 35 is contracted to elevate the bucket 33 for its scooping-up operation. In this way, the piping system is configured.

To the boss portion 38a of the valve operating link 38 and the arm portion 39e of the valve operating link 39, there are mounted erect locking brackets 51, 52 oriented upwards, respectively. And, at upper portions of the brackets 51, 52, there are defined lock pin hole 51a, 52a. The front and rear support brackets 40, 41 faun boss portions 53, 54, and into the elongate boss portion 54 attached to the support bracket 41, there is inserted a lock pin 55 for mechanically fixing the operating lever 26 at its neutral position. At an outer end (front end) of the lock pin 55, there is fixed a downwardly oriented L-shaped holding portion 55a. To the outer side (front side) of the support bracket 41, there is attached a horizontal receiving plate 56 defining two engaging holes 56a, 56b. The lower end of the L-shaped holding portion 55a is placed, due to the weight of its own, in slidable contact with the upper face of the receiving plate 56.

The lock pin 55 is operable by a crank-shaped lock operating tool 57. The lock operating tool 57 includes, at its lower end, an arm 58 engageable with the holding portion 55a of the lock pin 55. The arm 58 includes a slot 58a for engagement with the holding portion 55a and a downwardly oriented positioning pin 58b.

The lock operating tool 57 includes, at its upper portion, a downwardly oriented grip portion 57a bent in the form of reverse U-shape. In operation, when the grip portion 57a is slightly lifted up and then slightly pivoted to the right or left direction and then released from being lifted up, the positioning pin 58b of the arm 58 is disengaged from the engaging hole 56a (or 56b) of the receiving plate 56 and then rides onto the receiving plate 56. Under this condition where the lower end of the positioning pin 58b is in contact on the receiving plate 56, if the lock operating tool 57 is moved to slide the positioning pin 58b on the receiving plate 56, the positioning pin 58b will engage into the engaging hole 56b (or 56a) and at the same time, the lower end 57b of the grip portion 57a will engage into a lock position fixing portion 59R (or the lock-releasing position fixing portion 59U) of the positioning member 59, whereby the lock operating tool 57 will be fixed in position.

While the operating lever 26 is located at the neutral position, if the arm 58 is pivoted with an operation of the operating tool 57 to insert/withdraw the lock pin 55 to/from the lock pin holes 51a, 52a of the brackets 51, 52 via the holding portion 55a, the spool valves 23, 24 will be locked or lock-released. On the right-hand side of the driver's seat 4 and at an upper portion of the rear wheel fenders, there is provided positioning means 59 including a lock position fixing portion 59R for fixing the grip portion 57a at a lock position (r) and a lock-released position fixing portion 59U for fixing the position of the grip portion 59R at a lock-released position (u).

Figure 6:
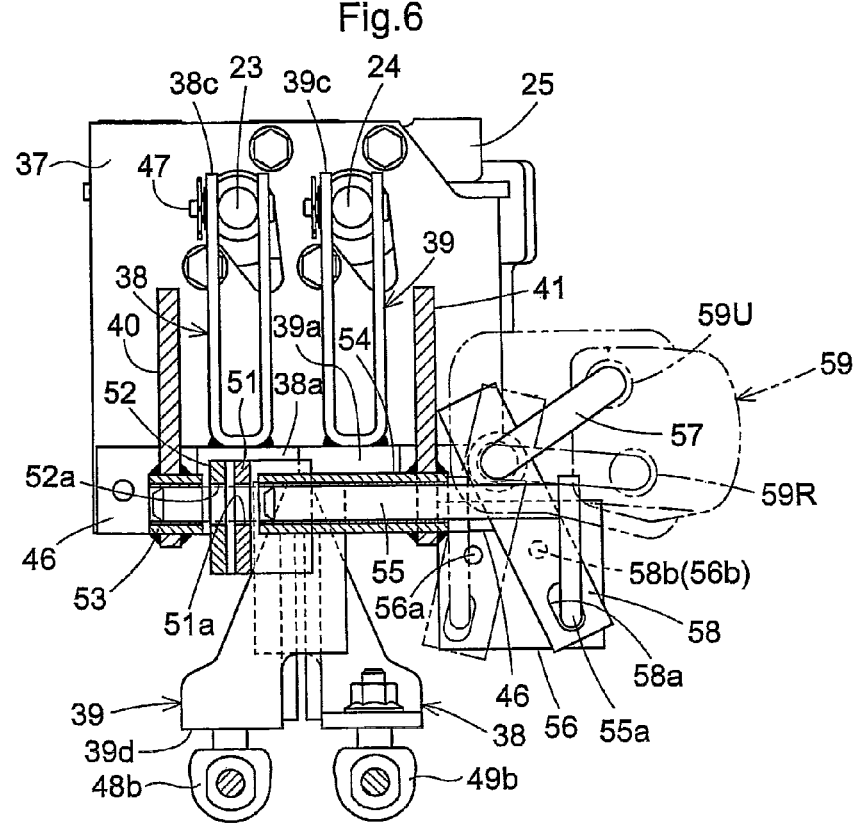
Figure 7:
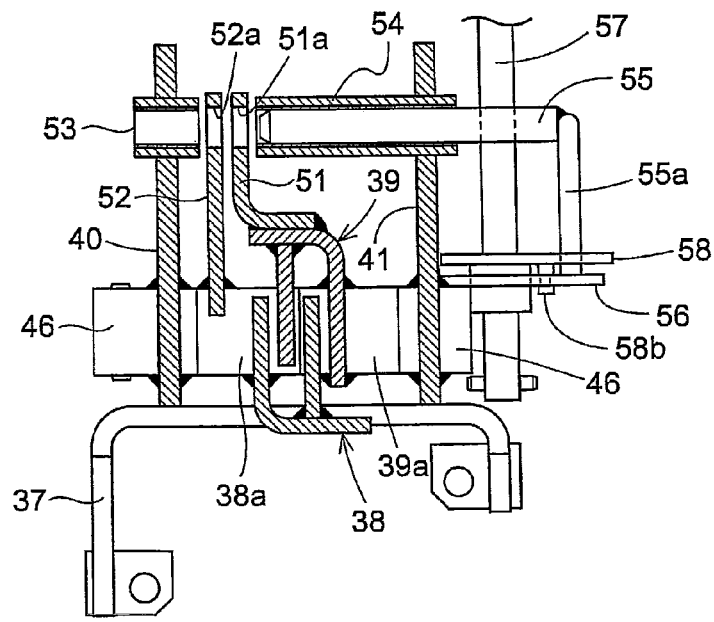
Figure 8:
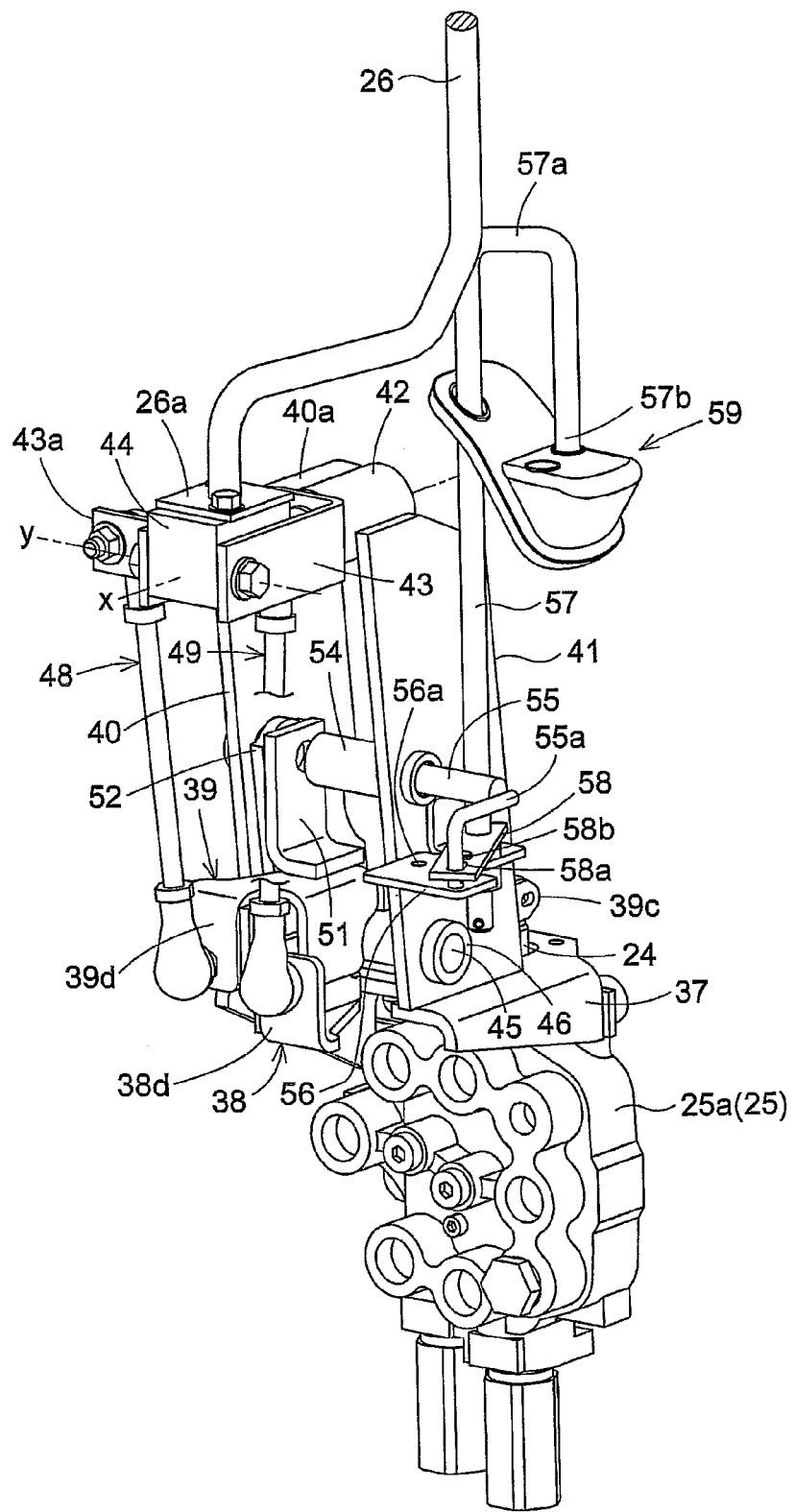
Figure 9:
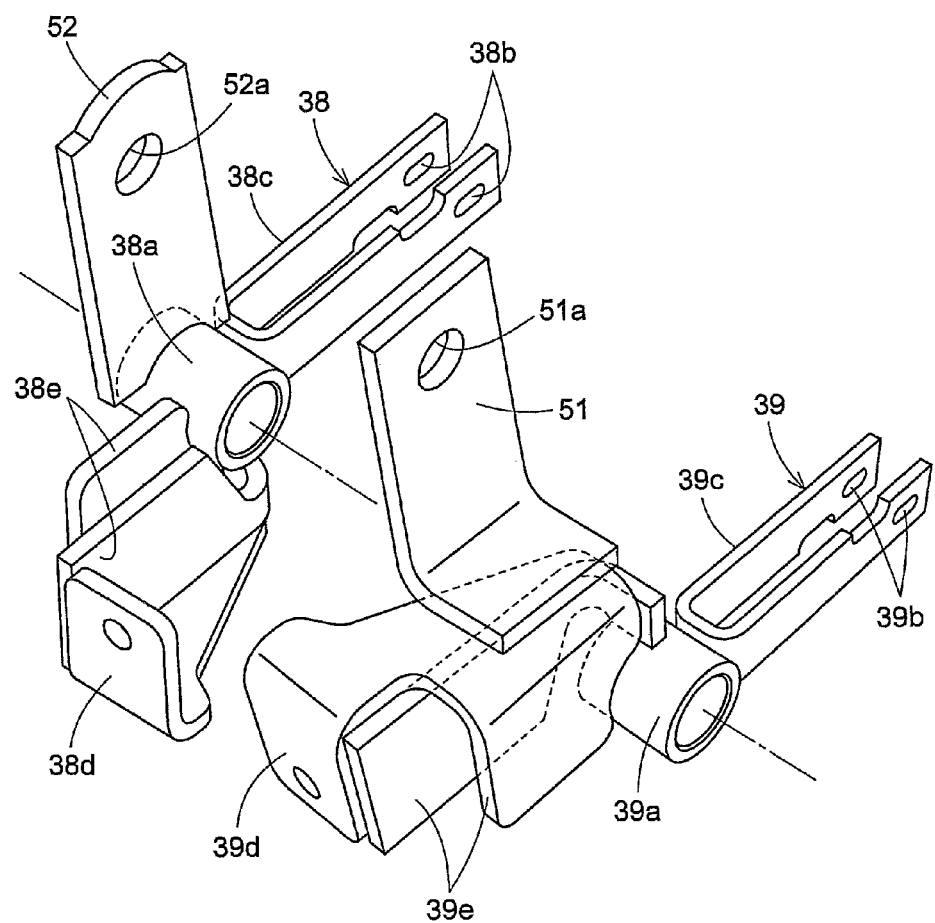
Figure 10:
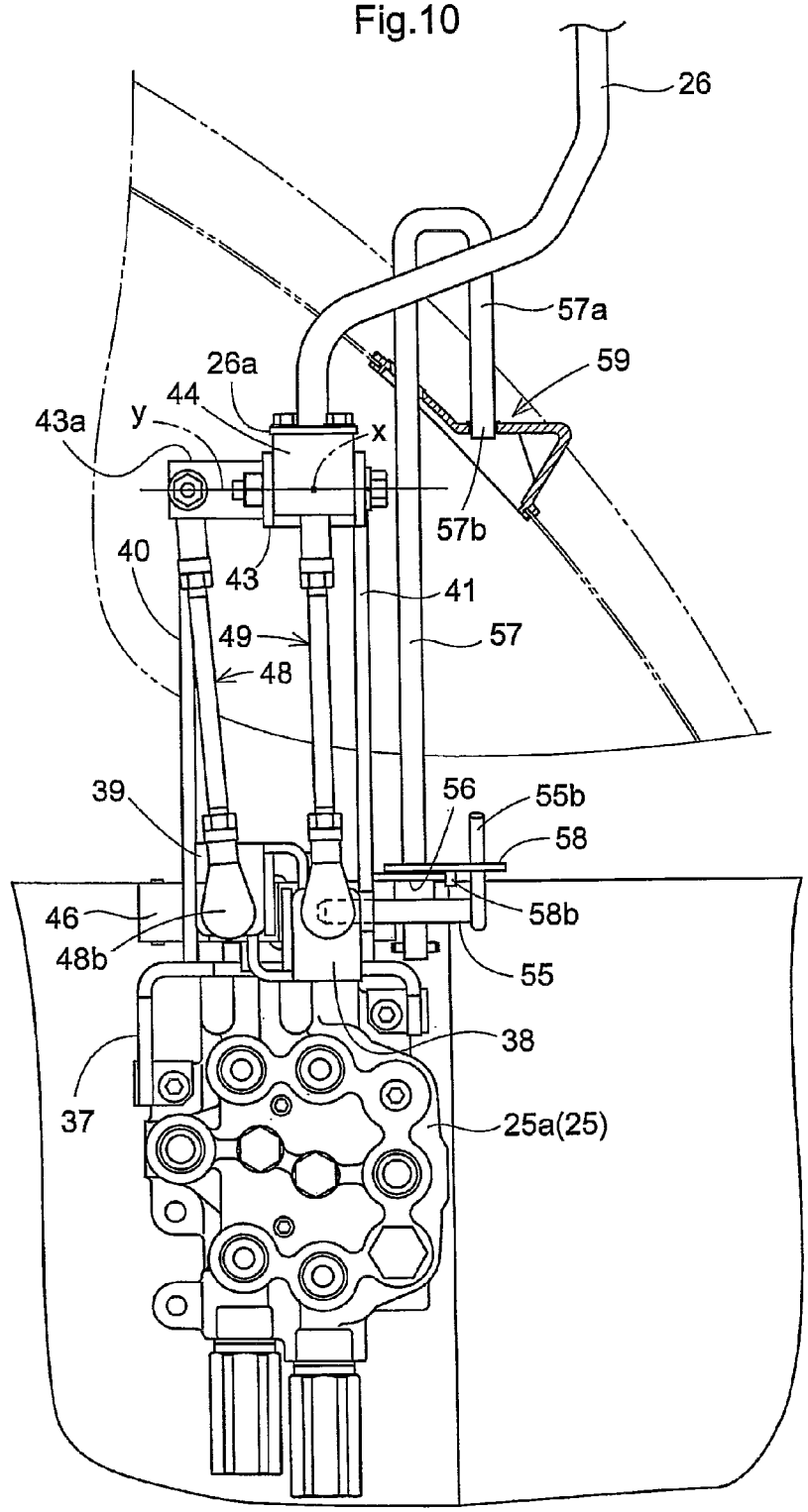

Under a non-work condition, with the operating lever 26 being set at the neutral position, as indicated by two-dot line in FIG. 4 and FIG. 6, the grip portion 57a of the lock operating tool 57 is operated to the outer side of the vehicle body to set the lower end 57b of the grip portion 57a to the lock position fixing portion 59R, whereby the lock pin 55 will be inserted into the pin holes 51a, 52a defined in the brackets 51, 52 attached to the valve operating links 38, 39 of the spool valves 23, 24 and inserted also into the boss portion 53 formed in the support bracket 40, so that the operating lever 26 is mechanically fixed at the neutral position. Under a working condition, from the condition of the operating lever 26 being mechanically fixed at the neutral position, as indicated by the solid line in FIG. 4 and FIG. 5, from the locked condition of the lock operating tool 57, the grip portion 57a of the lock operating tool 57 will be set from the lock position fixing portion 59R to the lock-released position fixing portion 59U, so that the lock pin 55 will be removed from the lock pin holes 51a, 52a of the brackets 51, 52 of the operating links 38, 39, whereby the crisscross operations of the operating lever 26 are made possible.

As described above, with the hydraulic apparatus according to this embodiment, the two spool valves 23, 24 for two hydraulic devices are operably coupled to the single operating lever 26, which lever 26 is configured to be operable in the first direction (front/back direction) and the second direction (right/left direction) intersecting the first direction, so that with operations of the operating lever 26 in the first direction and the second direction, the spool valves 23, 24 are operated separately and respectively. And, in the operative coupling mechanism between the two spool valves 23, 24 and the operating lever 26, there are interposed the valve operating links 38, 39 respectively coupled to the valves 23, 24, and the pair of frame plates (support brackets 40, 41) disposed across the valve operating links 39, 38 hold, from the opposed ends, the boss portion 42 which supports the right/left oriented support shaft 30 for operating the operating lever 26 in the first direction (front/back direction). The valve operating links 38, 39 for respectively operating the two spool valves 23, 24 are pivotally supported to the support shaft 45 provided in the pair of support brackets 40, 41 and the lock pin 55 is provided in the support bracket 41 to be slidable relative thereto. The two valve operating links 38, 39 form the pin holes 51 a, 52a via the brackets 51, 52 formed integrally therewith. When the two spool valves 23, 24 are at the neutral positions, the lock pin 55 is inserted into the pin holes 51a, 52a with a locking operation by the lock operating tool 57, thus fixing the valve operating links 38, 39, whereby the spool valves 23, 24 are locked.

With the above, the boss portion 42 supporting the support shaft 30 of the operating lever 26 is held and clamped from the opposed sides thereof by the pair of support brackets 40, 41 disposed across the valve operating links 38, 39, so the support brackets 40, 41 per se are formed sturdy and the boss portion 42 too is firmly clamped and held by the support brackets 40, 41. Accordingly, even when the operating lever 26 is operated in the two directions, there occurs no displacement or looseness in the boss portion 42. Consequently, the support shaft 30 can be maintained in a reliable manner and the operating lever 26 will not be displaced from the first direction and the lever operations may be carried out smoothly and lightly.

When the two spool valves 23, 24 are located at the neutral positions, the two valve operating links 38, 39 are fixed simultaneously by inserting the single lock pin 55 into the plurality of pin holes 51a, 52a formed in the two valve operating links 38, 39, thus locking the spool valves 23, 24. That is to say, the spool valves 23, 24 are locked by inserting the single lock pin 55 into the holes 51a, 52a formed in the two valve operating links 38, 39 provided respectively and separately for operating the two spool valves 23, 24. Therefore, the valve operating links 38, 39 for operating the spool valves 23, 24, whether the valve operated in the first direction (front/back direction) or the valve operated in the second direction (right/left direction), are locked in a reliable manner at the valve neutral positions, so that even if there exists some play on the side of the operating lever 26, the spool valves 23, 24 can be locked reliably at the neutral positions.

[Second Embodiment]

FIGS. 10-16 show a work vehicle (tractor) according to a second embodiment. In the following discussion, locking means different in the following respects from the one in the foregoing first embodiment will be described. The rest of the construction is identical to the main embodiment.

Figure 13:
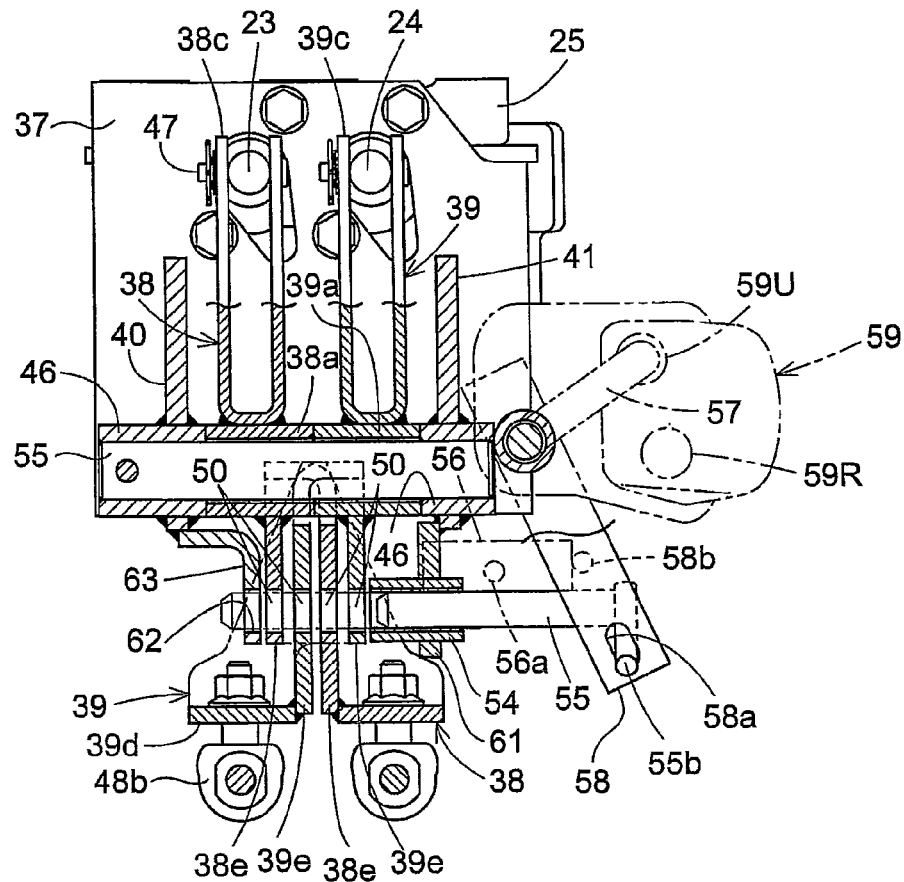
Figure 14:
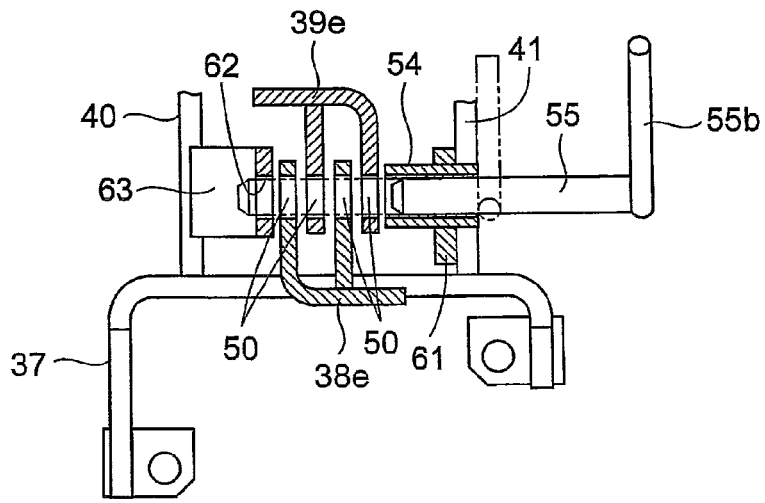
Figure 15:
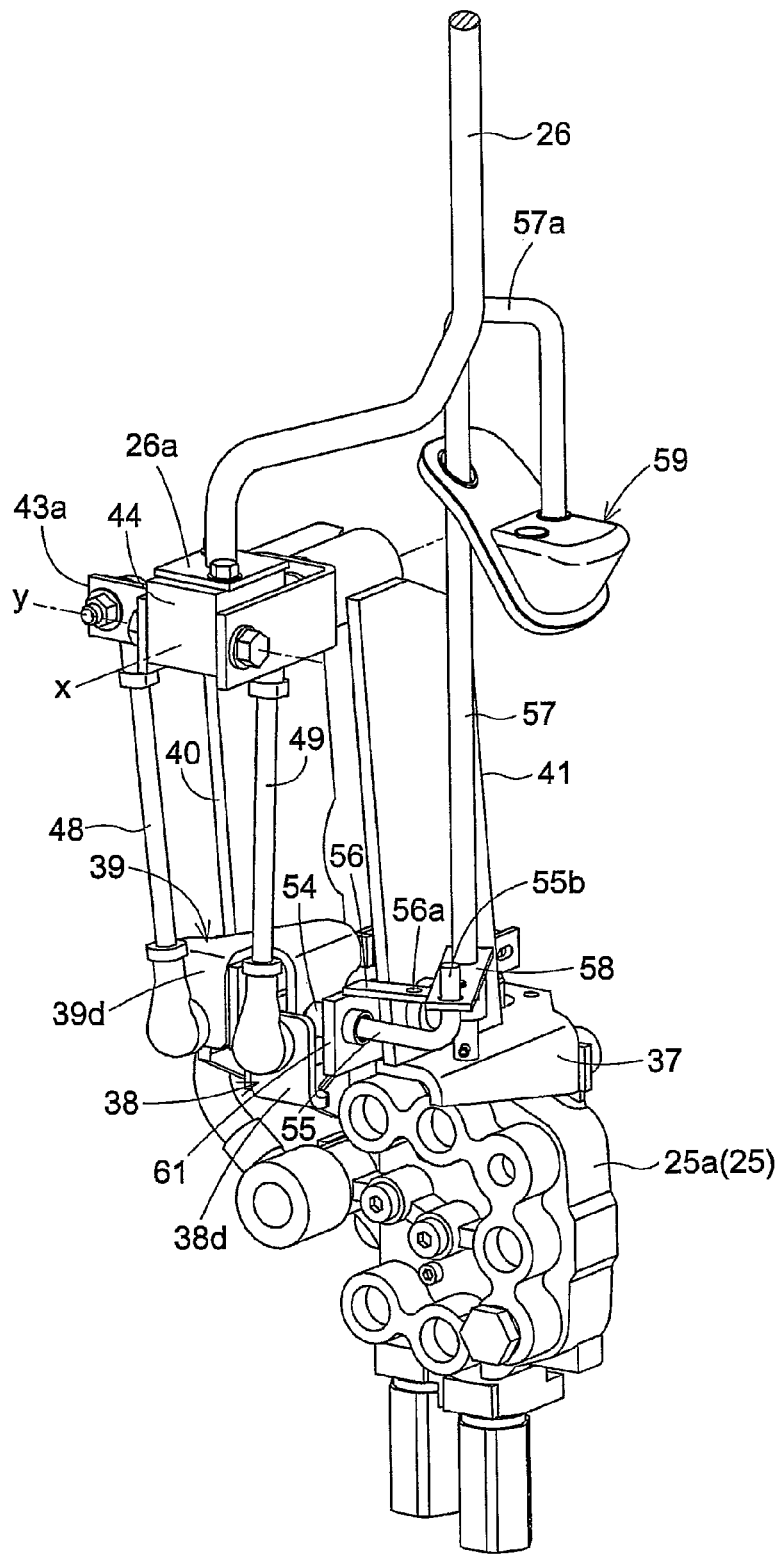
Figure 16:
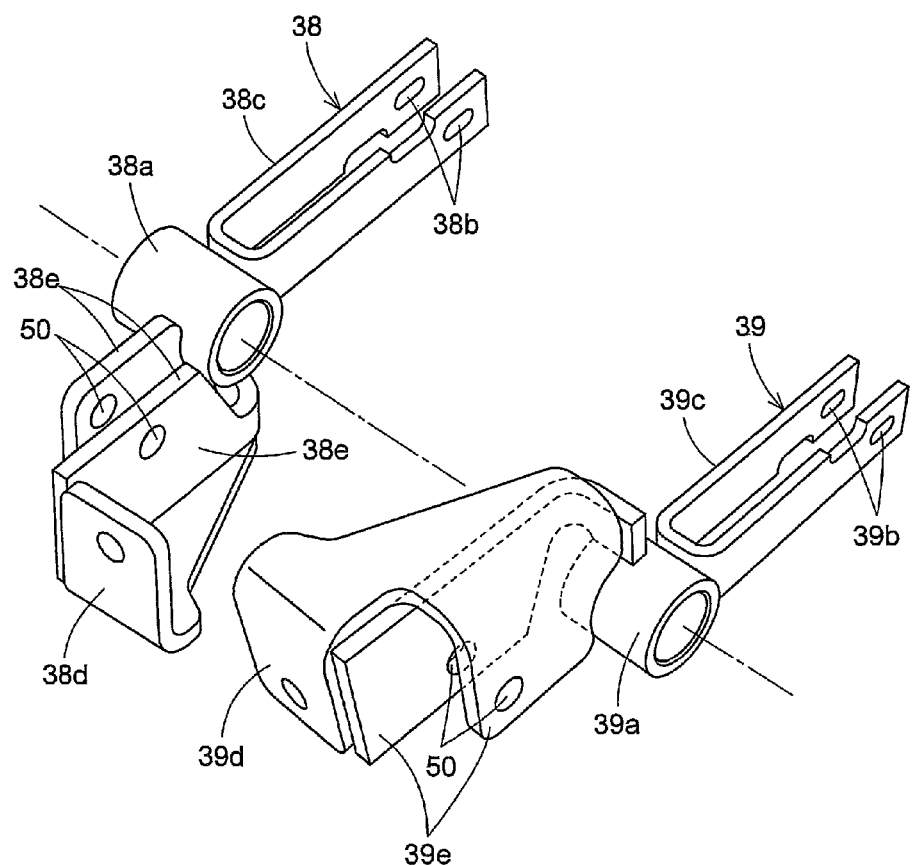

As shown in FIG. 13 and FIG. 14, lock pin holes 50 are formed continuously in series through the two-forked arm portions 38e, 39e of the valve operating links 38, 39. A bracket 61 having a boss portion 54 is attached to the support bracket 41 and into this boss portion 54, there is inserted a lock pin 55 having an engaging portion 55b bent in the shape of upwardly oriented L-shape. To the rear bracket 40, there is attached a bracket 63 forming a pin hole 62 which is located coaxially with the plurality of pin holes 50, when the operating lever 26 is located at the neutral position. To the upper portion of the bracket 61, there is attached a horizontal receiving plate 56 forming an engaging hole 56b, the receiving plate 56 being oriented more outward (front side) than the support bracket 41.

Figure 11:
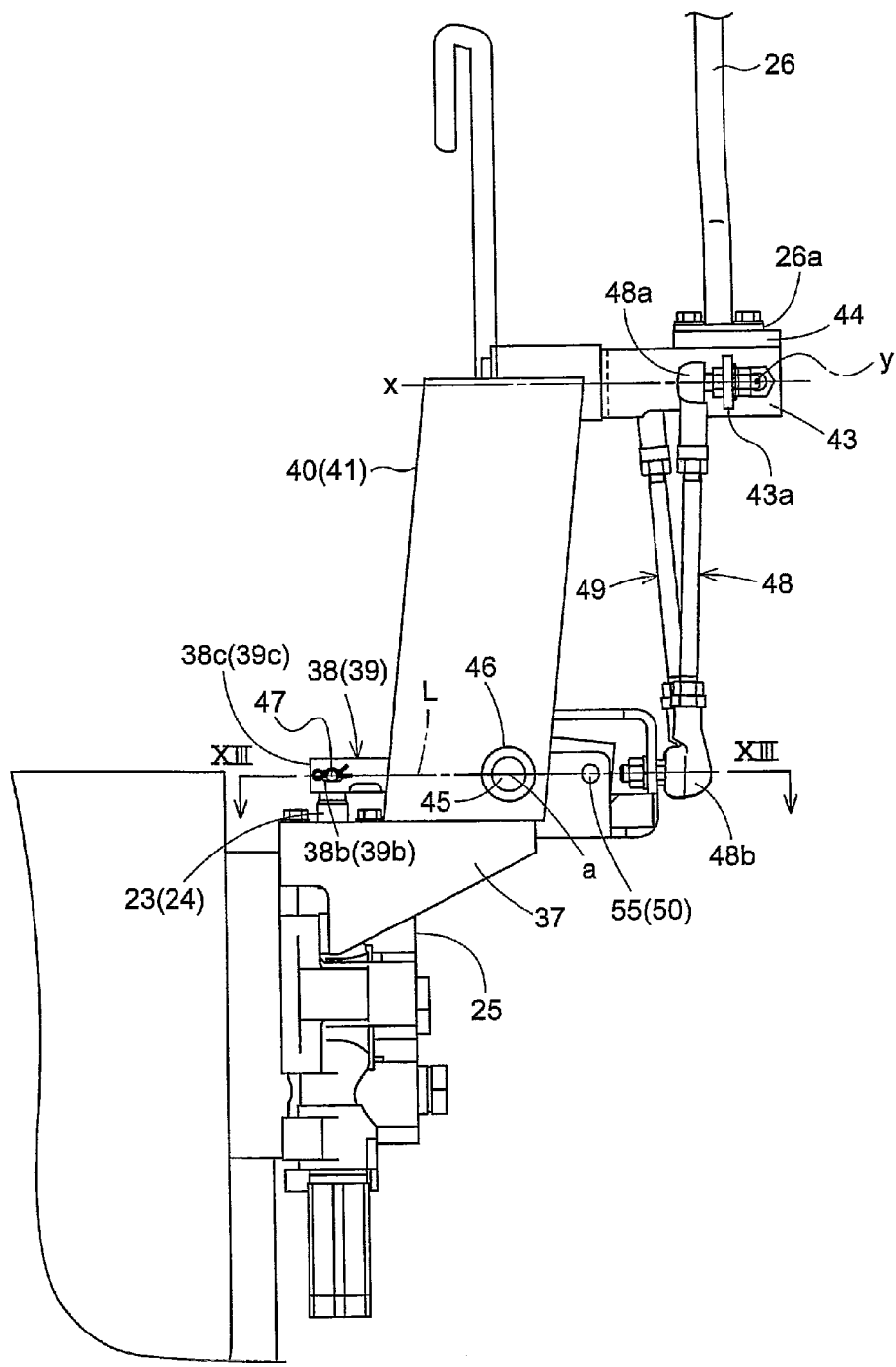
Figure 12:
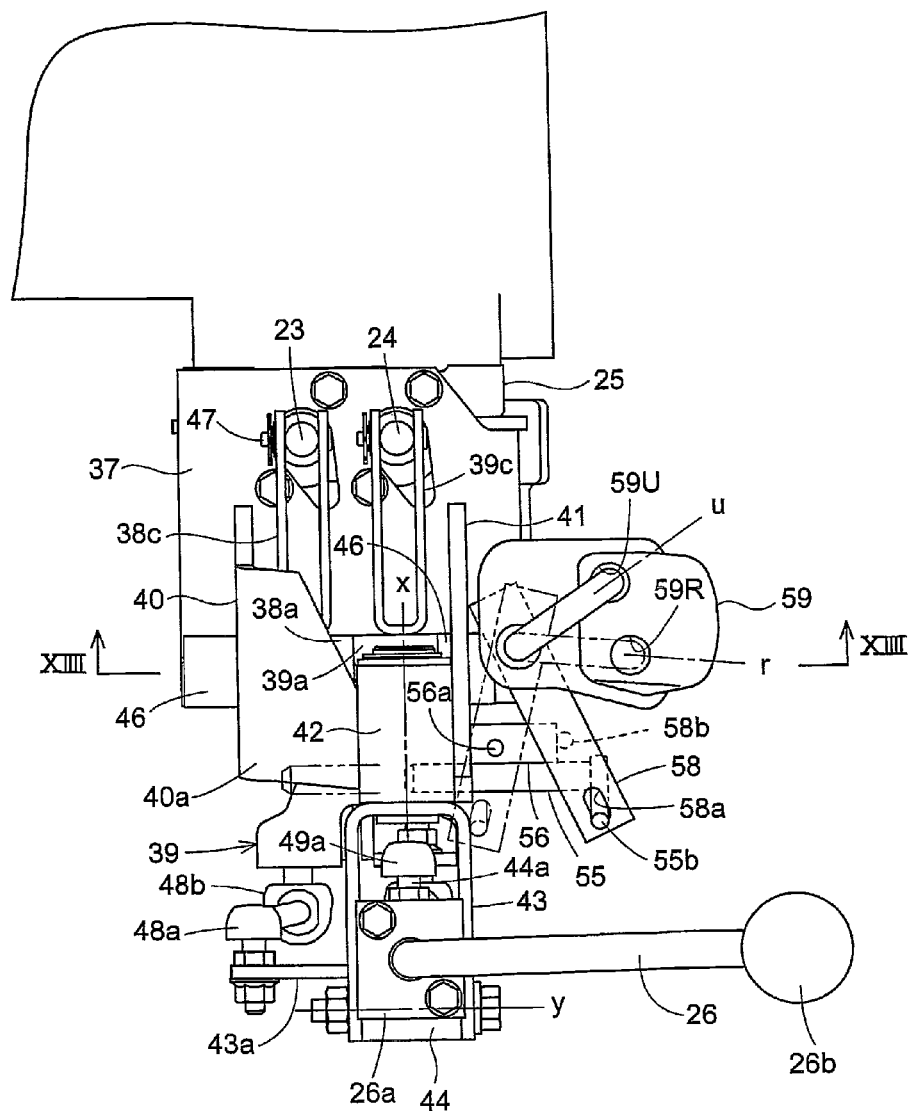

As shown in FIG. 11, the working point on the side of the spool valve 23, 24 (the position of the pin 47), the axis (a) (pivot) of the front/back oriented support shaft 45, the axis of the lock pin 55, and the coupling members 48b, 49b (power points) are aligned side by side along a straight line L in the rear view, and the lock pin 55 is located at the right/left intermediate portion between the front/back oriented support shaft 45 and the coupling members 48b, 49b.

The arm 58 provided at the lower end of the lock operating tool 57 includes a slot 58a for engagement with the reverse L-shaped holding portion 55a and a downwardly oriented positioning pin 58b.

When the lock operating tool 57 is located at the lock-released position (u), the downwardly oriented positioning pin 58b formed on the arm 58 is offset to the front side beyond the leading end (front end) of the receiving plate 56, and the lower end of the positioning pin 58b is located lower than the upper face of the receiving plate 56. For locking the spool valve 23, 24 from this condition, the grip portion 57a of the lock operating tool 57 will be slightly lifted up and slightly pivoted in the right direction and then lifting of the grip portion 57a will be released, whereby the positioning pin 58b of the arm 58 will ride over the receiving plate 56. Under this condition of the lower end of the positioning pin 58b being in contact on the receiving plate 56, the lock operating tool 57 will be moved further to the right, thereby to cause the positioning pin 58b to slide on the receiving plate 56, the positioning pin 58b will engage into the engaging hole 56a and at the same time the lower end 57b of the grip portion 57a will fit into the lock position fixing portion 59R, whereby the lock operating tool 57 will be fixed in position. Under the locked condition, the valve operating links 38, 39 are fixed with the lock pin 55 being inserted into all of the pin holes 50 formed in the arm portions 38e, 39e and into the pin hole 62 formed in the bracket 63, thus locking the spool valves 23, 24.

Incidentally, in the first and second embodiments, the spool valves 23, 24 are employed as the switchover valve 25. Instead, rotary type valves may be employed.

[Third Embodiment]

Figure 17:
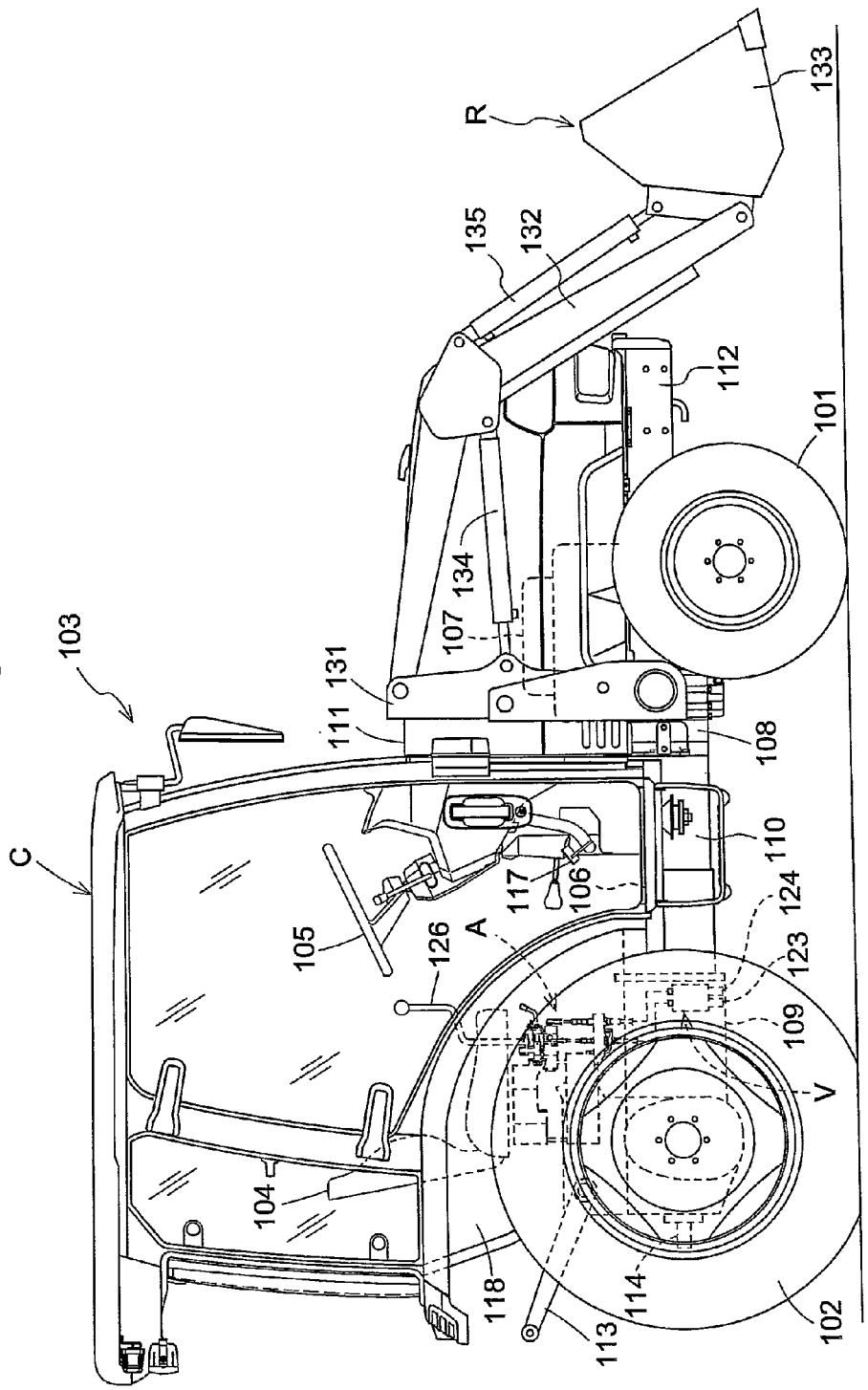

FIGS. 17-22 show a work vehicle (tractor) according to a third embodiment. In this embodiment, FIG. 17 shows a partial side view of a cabin type tractor mounting a front loader R. In this tractor, on a four-wheel driven type traveling vehicle body 103 including front wheels 101 and rear wheels 102, there is mounted a cabin C including a driver's seat 104, a front wheel steering wheel 105, a driver's access step 106, etc.

The traveling vehicle body 103 includes an engine (not shown) disposed inside a hood 111 provided at a front portion of the vehicle body, and a front frame 112 supporting the engine. Between the engine and a transmission case 109 disposed at a rear portion of the vehicle body, a gear case 108 and an intermediate housing 110 formed of plate metal and having a hollow structure are disposed. Inside the cabin C, a pair of, right/left brake pedals 117 are provided on the right side and forwardly of the driver's access step 106. At a rear portion of the transmission case 109, there are mounted a hydraulic driven type lift arm 113 and a rear PTO shaft 114 for taking off power for a work implement (not shown) to be mounted to the rear portion.

To the front portion of the traveling vehicle body 103, the front loader R is detachably connected. A hydraulic apparatus for driving this front loader R is constructed as follows.

At a lateral portion of the transmission case 109 on the right side and at a lower position of the driver's seat 104, there are mounted a pair of switchover valves V, and inside the cabin C, an operating lever 126 for switching over the switchover valves V extends upward from the position of a lever operating mechanism A. The lever operating mechanism A is supported to the transmission case 109 and is attached to upper and lower frames 119, 120 disposed in the front/back direction along the inner side of the rear wheel fenders 118. The switchover valve V includes two, three-position switchover type, spool valves 123, 124 mounted in juxtaposition in the front/back direction, to be operably coupled with the operating lever 126 as will be described later. With crisscross operations of the operating lever 126, feeding/draining of pressure oil to/from the two sets of hydraulic circuits (not shown) is possible.

Referring to the front loader R, to a support frame 131 connected and fixed to front right/left portions of the traveling vehicle body 103, a boom 132 is connected to be vertically pivotable. And, a bucket 133 is pivotally connected to the leading end of the boom 132 to be capable of pivotal dumping actions. And, a boom cylinder 134 and a bucket cylinder 135 which comprise double-action type cylinders are connected and communicated to the valves 123, 124 via unillustrated oil passageways, respectively.

Figure 22:
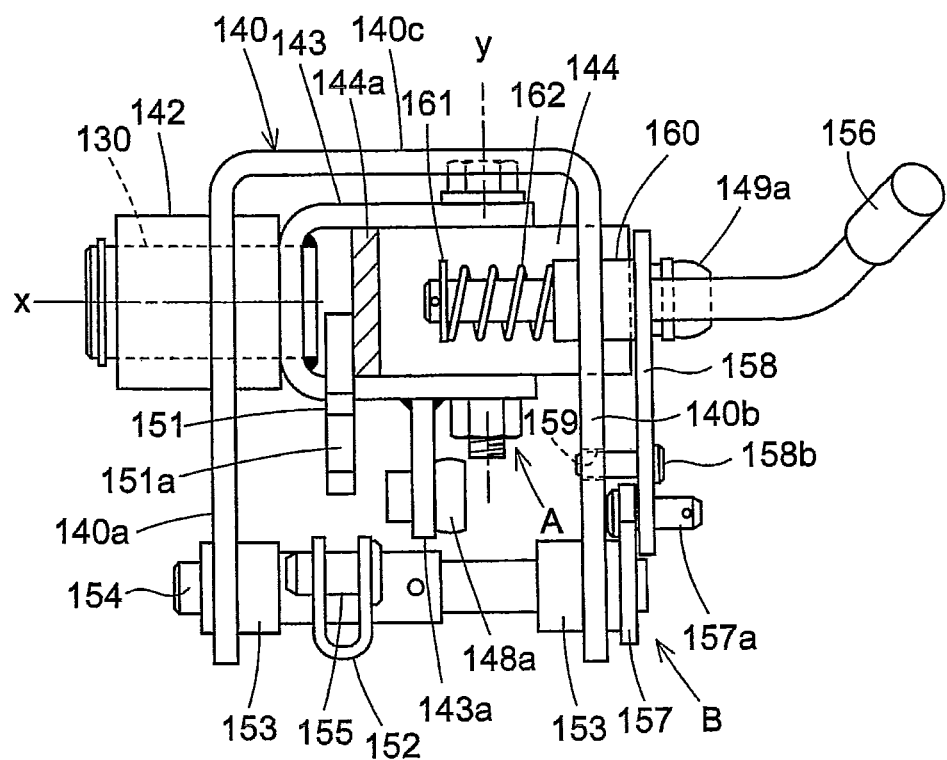

FIGS. 18-22 show a lever operating mechanism A for the operating lever 126 and a locking mechanism B for the switchover valves V. As shown in FIG. 22, on the right side of the driver's seat 104, there is disposed a fixed frame 140 having an outwardly opened angular U-shape in the plan view, with its intermediate piece 140*c* being located on the inner side, opposed pieces 140*a*, 140*b* being located on the front and back sides. The fixed frame 140 is a fixed portion fixed to the vehicle body. And, to this fixed frame 140 acting as the fixed portion, there are attached the lever operating mechanism A for operating the operating lever 126 in the first direction (front/back direction) and the second direction (right/left direction) and the locking mechanism B for locking the operating lever 126 at its neutral position.

The lever operating mechanism A is constructed as follows.

As shown in FIG. 21 and FIG. 22, the fixed frame 140 having an angular U-shape in the plan view includes a vehicle body rear side piece 140*a*. To this piece 140*a*, a fore/aft oriented boss 142 is fixed, with the boss 142 extending along the front/back oriented axis (x). To this boss 142, a support shaft 130 is supported to be rotatable about the front/back oriented axis (x), with a first operating tool 143 mounted thereon having an angular hook-like shape in plan view. To the first operating tool 143, a second operating tool 144 is pivoted to be pivotable about the right/left oriented axis (y). To the first operating tool 143 too, a connecting portion 126*a* of the operating lever 126 is fixed via a base end member 144*a* attached erect on the upper face of the second operating tool 144 and via a connecting portion 144*b* fixed to the upper end of the base member 144*a*. The second operating tool 144 is formed integral with the operating lever 126 to be movable together with this operating lever 126 and constitutes the base portion of the operating lever 126.

Figure 18:
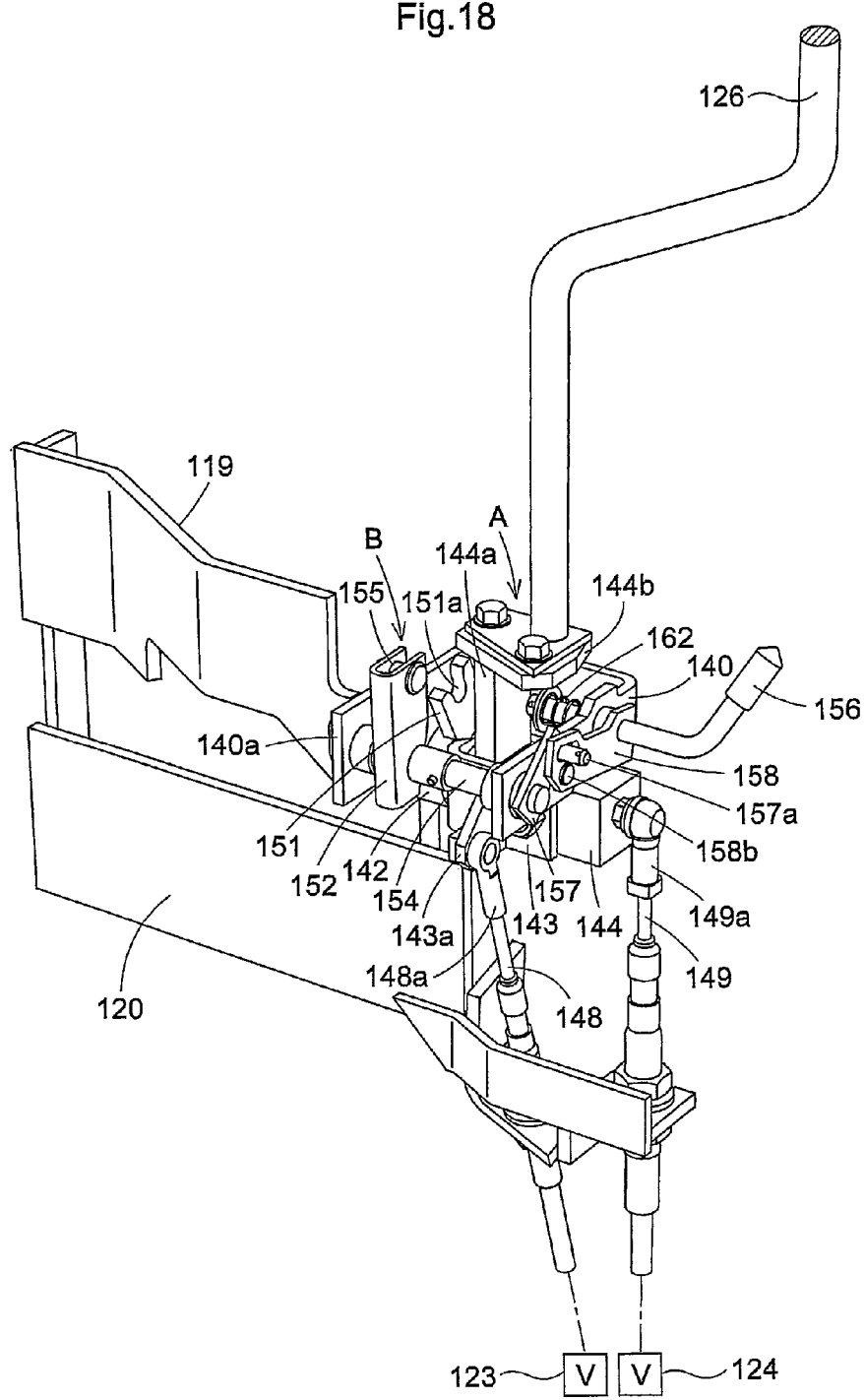
Figure 19:
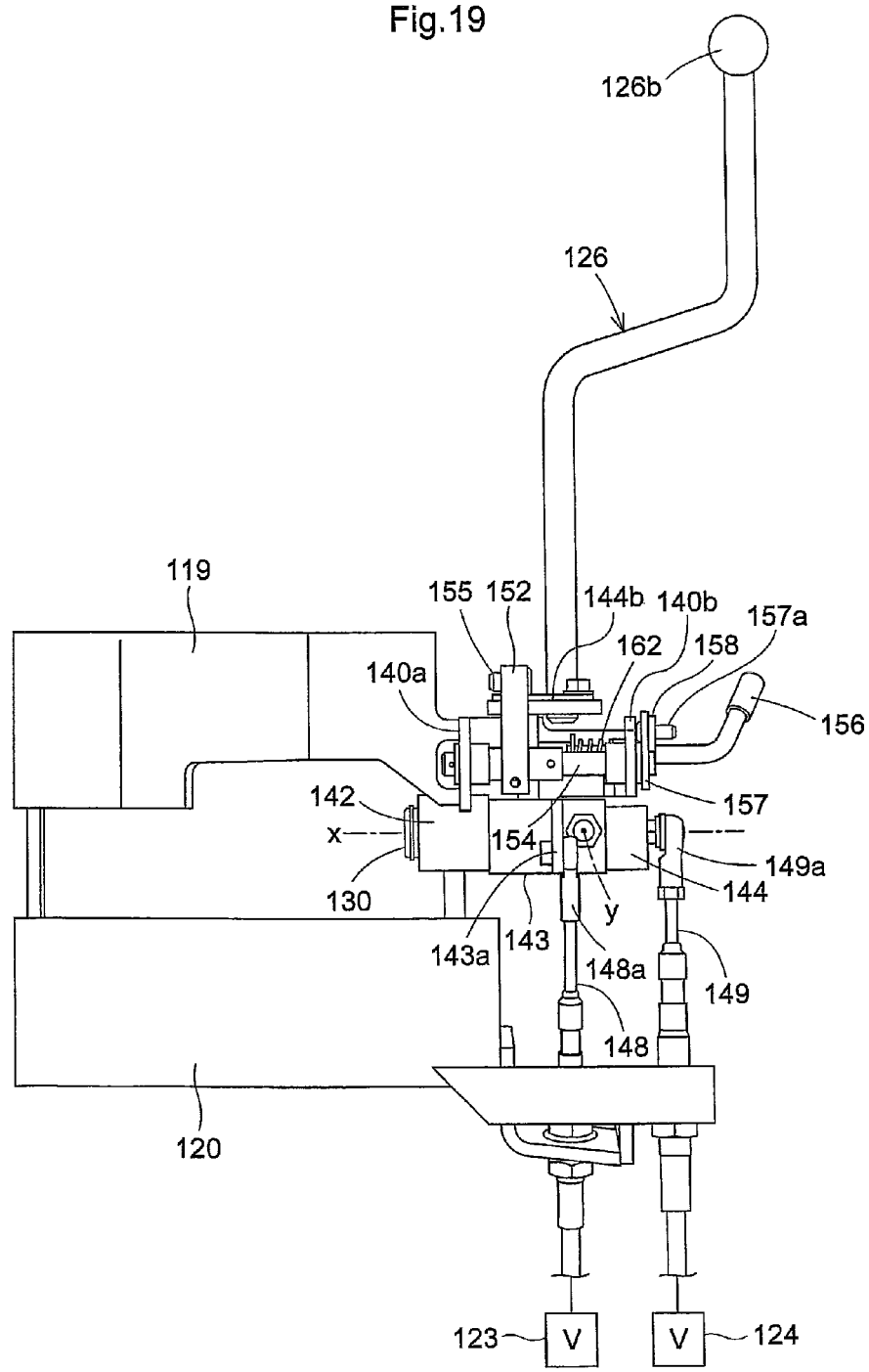
Figure 20:
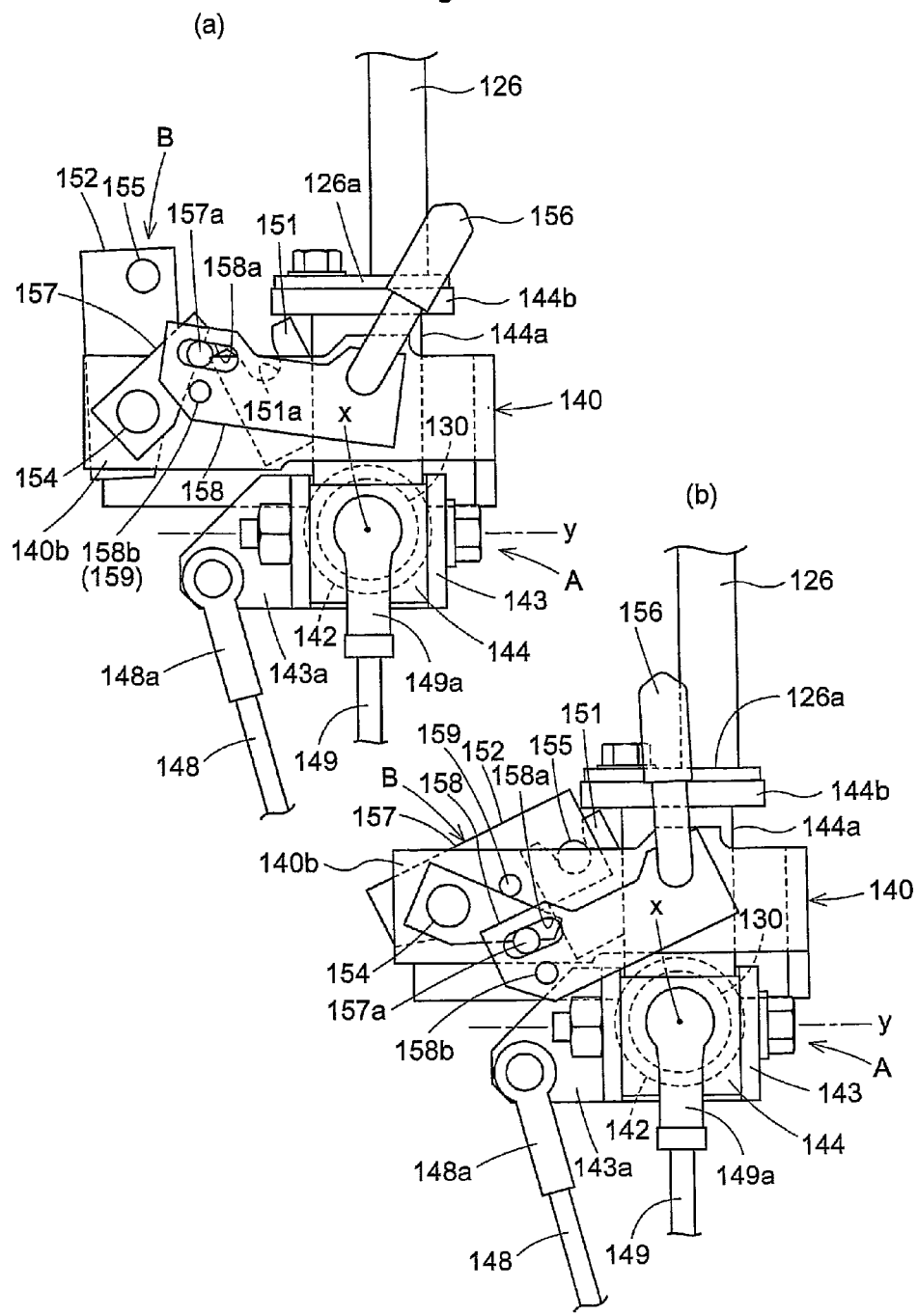

As shown in FIGS. 18-20, to the first operating tool 143, an operating aim 143*a* is connected, with the arm 143 being oriented to the right outer side. To this operating arm 143*a*, a valve 123 is operably coupled via a push-pull wire 148 having a coupling member 148*a*. Further, to the second operating tool 144, a valve 124 is operably coupled via a push-pull wire 149 having a coupling member 149*a*.

Thus, when the operating lever 126 is operated to a neutral position (the intersection of the cross) in the front/back direction (first direction) and in the right/left direction (second direction), the two valves 123, 124 will be located at the neutral positions. When the grip 126*b* of the operating lever 126 is moved from the neutral position to the right or left side, the first operating tool 143 will be pivoted about the front/back oriented axis (x), so that one valve 123 will be operated. When the grip 126*b* of the operating lever 126 is operated from the neutral position to the front or the back side, the second operating tool 144 will be pivoted about the right/left oriented axis (y), so that the other valve 124 will be operated.

To the hydraulic circuit switched over by one valve 123, a boom cylinder 134 is pipe-connected. To the hydraulic circuit switched over by the other valve 124, a bucket cylinder 135 is pipe-connected. Then, when the grip portion 126*b* of the operating lever 126 is operated from the neutral position to the front side, the boom cylinder 134 will be contracted to lower the boom 132. When the grip portion 126*b* of the operating lever 126 is operated from the neutral position to the back side, the boom cylinder 134 will be expanded to elevate the boom 132. When the grip portion 126*b* of the operating lever 126 is operated from the neutral position to the right side, the bucket cylinder 135 will be expanded to dump the bucket 133 downwards. When the grip portion 126*b* of the operating lever 126 is operated from the neutral position to the left side, the bucket cylinder 135 will be contracted to elevate the bucket 133 for scooping.

Next, the locking mechanism B will be explained in detail.

As shown in FIGS. 18-22, to the base end member 144*a* formed erect on the second operating tool 144, there is fixed a locking concave member 151 forming a concave portion 151*a* comprised of a cutout portion which cuts out the end portion to render it open obliquely right, upper direction, and there is provided a plate-like clamping member 152 having a U-shaped cross section in the plan view and engaging this concave member 151 by clamping it from its opposed sides, with the clamping member 152 having a lock pin 55 engageable with the concave portion 151*a*.

The clamping member 152 is pivotally fixed to a support shaft 154 acting as a support portion supported to a front/back boss portions 153 formed respectively in front and back side pieces 140*a*, 140*b* of the fixed frame 140 having a U-shaped cross section as seen in the plan view. The support shaft 154 is operably coupled to a lock operating tool 156 pivotally supported to the front side piece 140*b* of to fixed frame 140 and pivots the clamping member 152 for engagement with the concave member 151 in response to an operation of the lock operating tool 156, thus locking the operating lever 126.

The support shaft 154 extends through the front/back boss portions 153 on the fixed frame 140, and to the front end of the support shaft 154 projecting forwardly of the front side piece 140*b*, there is fixed an arm 157 having a pin 157*a* at its free end. The lock operating tool 156 forms an elongate slot 158*a* for engagement with the pin 157*a*, and at a position downwardly of the elongate slot 158*a*, there is fixed an arm 158 having a positioning pin 158*b* (corresponding to "holding means") projecting toward the side of the side piece 140*b* (to the back side).

Under the lock-released condition shown in FIG. 19 and FIG. 20 (*a*), for retaining the positioning pin 158*b* to the side piece 140*b*, the side piece 140*b* forms a pin hole 159.

The lock operating tool 156 is inserted into a boss portion 160 provided in the side piece 140*b* of the fixed frame 140 to be slidable in the front/back direction. At the rear end of the lock operating tool 156, a stopper 161 is provided, and between this stopper 161 and the rear end face of the boss portion 160, a spring 162 is interposed, so that the lock operating tool 156 is urged to the back side so as to retain the arm 158 in position, under the condition in contact with the front end of the boss portion 160.

As shown in FIGS. 20 (*a*), (*b*), when the locking mechanism B is under the lock-released condition (see FIG. 20 (*a*)), the positioning pin 158*b* provided in the arm 158 is in engagement with the pin hole 159 formed in the side piece 140*b*. With this, the locking mechanism B is maintained under the lock-released condition. For releasing this lock-released condition, the lock operating tool 156 will be pulled to the front side against the urging force of the spring 162 and the lock operating tool 156 will be moved counter-clockwise from the condition in FIG. 20 (a). When the lock operating tool 156 is pulled out and pivoted counter-clockwise slightly and then released, the positioning pin 158b which has moved out of the pin hole 159 will ride over the front face of the side piece 140b. Under this condition where the leading end of the positioning pin 158b is in contact with the front face of the side piece 140b, the lock operating tool 156 will be moved to cause the positioning pin 158b to slide downward on the front face of the side piece 140b, whereby the positioning pin 158b will enter the space downwardly of the lower edge of the side piece 140b, so that the lock operating tool 156 will be fixed in position. With this, as illustrated from FIG. 20 (a) to FIG. 20 (b), the clamping member 152 is pivoted downward and the clamping member 152 clamps the concave member 151 from its opposed sides and the lock pin 155 is engaged with the concave portion 151 a, thus realizing a locked condition. Under this locked condition, the positioning pin 158b is placed in contact with the lower edge of the side piece 140b, so that the locking mechanism B is maintained under the locked condition.

For releasing the operating lever 126 from the locked condition, as illustrated from FIG. 20 (b) to FIG. 20 (a), from the locked condition where the positioning pin 158b projects into the space downwardly of the lower edge of the side piece 140b, the lock operating tool 156 is pulled out against the urging force of the spring 162 and the lock operating tool 156 is pivoted clockwise in the illustrated plane thereby to pivot the arm 158 upward with the leading end of the positioning pin 158b in sliding contact with the side piece 140b, so that the locking mechanism B is rendered into the lock-released condition shown in FIG. 20 (a) and the locking mechanism B is maintained in position. With this, as shown in FIG. 20 (a), the clamping member 152 is pivoted upward to move away from the concave member 151 and the lock pin 155 is moved away from the concave portion 151a.

As described above, according to the hydraulic apparatus of this embodiment, the two valves 123, 124 for the two hydraulic units are operably coupled to the single operating lever 126. And, this operating lever 126 is operable in the first direction (front/back direction) and the second direction (right/left direction) intersecting the first direction. And, the operating lever 126 is operated in the first direction and the second direction, so that the valves 123, 124 are operated individually. And, there is provided the locking mechanism B for locking the operating lever 126 when the two valves 123, 124 are located at the neutral positions. This locking mechanism B is attached to the second operating tool 144 of the operating lever 126, with the concave member 151 forming the concave portion 151 a at the end thereof, with the clamping member 152 being attached to the support shaft 154 and engageable with the concave member 151 by clamping it from its opposed sides, and with the pin 155 being provided in the clamping member 152 for the engagement with the concave portion 151 a. When the operating lever 126 is located at the neutral position, the pivot shaft 154 is rotated to engage the concave member 151 between the pair of members 152a, 152a of the clamping member 152, and the pin 155 provided in the clamping member 152 is engaged in the concave portion 151a formed in the concave member 151, so that the operating lever 126 is locked to be immovable both in the first direction and the second direction.

With the above arrangement, with the clamping of the concave member 151 by the clamping member 152 (first engagement), the operating lever 126 is locked against its movement in the first direction (front/back direction). And, with the engagement between the concave portion 151a of the concave member 151 and the pin 155 of the clamping member 132 (second engagement), the operating lever 126 is locked against its movement in the second direction (right/left direction). Hence, the locking of the operating lever 126 in the first direction and the second direction can be effected in a reliable manner, and the lever operations can be effected smoothly and lightly.

Incidentally, in the third embodiment, the concave member 151 having the concave portion 151a is provided at the base portion 144 of the operating lever 126, whereas the clamping member 152 having the pin 155 is provided in the support portion (support shaft 154). Instead, the concave member 151 and the clamping member 152 may be arranged vice versa, so that the clamping member 152 is provided in the base portion 144 of the operating lever 126, and the concave member 151 is provided in the support portion (support shaft 154).

Further, in the third embodiment, the clamping member 152 having the pin 155 is fixed to the support shaft 154, and with pivoting of the clamping member 152 about the support shaft 154, its engagement with the concave member 151 having the concave portion 151 a is realized. Instead, the clamping member 152 may be guided by an unillustrated guiding member to move linearly to engage/disengage with/from the concave member 151. Or, the clamping member 152 may be moved as being driven by a driving unit such as an unillustrated cylinder, motor or the like, to engage/disengage with/from the concave member 151.

Further, in the third embodiment, the clamping member 152 is formed by bending a plate into the U-shape. Instead, this clamping member 152 may be formed by connecting together two plates spaced apart from each other.

The present invention is applicable not only to a tractor having the front loader R, but also to a tractor having a snow removing apparatus or a grass mowing apparatus.

What is claimed is:

1. A work vehicle having a hydraulic apparatus, comprising:
    a single operating lever;
    a first valve operable by an operation of the operating lever in a first direction;
    a second valve operable by an operation of the operating lever in a second direction intersecting the first direction;
    a locking mechanism for locking the operating lever at a neutral position thereof, the locking mechanism including:
        a concave member attached to one of a movable support portion and a base portion of the operating lever, the concave member defining a concave portion at an end thereof;
        a clamping member attached to the other of the movable support portion and the base portion of the operating lever for clamping the concave member, the clamping member including a pin engageable with the concave portion;
    wherein, when the operating lever is at the neutral position, the operating lever is locked to be immovable in the first or second direction by moving the support portion to cause the clamping member to clamp the concave member and also to cause the pin to engage the concave portion.

2. The work vehicle according to claim 1, wherein:
    the support portion comprises a pivotable and fixable support shaft, and when the operating lever is located at the neutral position, the operating lever is locked to be immovable in the first or second direction by pivoting the support shaft.

3. The work vehicle according to claim 1, further comprising holding means for holding a locked condition provided by the engagement between the concave member and the clamping member and also holding a lock-released condition provided by detachment between the concave member and the clamping member.

* * * * *